United States Patent
Gao et al.

(10) Patent No.: US 12,520,308 B2
(45) Date of Patent: Jan. 6, 2026

(54) METHOD, DEVICE AND COMPUTER READABLE STORAGE MEDIUM OF COMMUNICATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 380 days.

(21) Appl. No.: 18/270,155

(22) PCT Filed: Dec. 29, 2020

(86) PCT No.: PCT/CN2020/140827
§ 371 (c)(1),
(2) Date: Jun. 28, 2023

(87) PCT Pub. No.: WO2022/141050
PCT Pub. Date: Jul. 7, 2022

(65) Prior Publication Data
US 2024/0114504 A1    Apr. 4, 2024

(51) Int. Cl.
*H04W 72/1268*    (2023.01)
*H04L 5/00*    (2006.01)
*H04W 72/232*    (2023.01)

(52) U.S. Cl.
CPC ....... *H04W 72/1268* (2013.01); *H04L 5/0051* (2013.01); *H04W 72/232* (2023.01)

(58) Field of Classification Search
CPC ... H04L 5/0094; H04L 5/0051; H04L 5/0053; H04L 5/0048; H04L 5/0023; H04W 72/232; H04W 72/1268; H04W 72/21; H04W 16/28; H04W 88/02; H04W 72/044; H04W 72/542; H04B 7/0639; H04B 7/0404; H04B 7/0617

See application file for complete search history.

(56) References Cited

U.S. PATENT DOCUMENTS

| | | |
|---|---|---|
| 2020/0106645 A1 | 4/2020 | Tsai et al. |
| 2020/0137592 A1 | 4/2020 | Guo et al. |
| 2020/0389885 A1 | 12/2020 | Tomeba et al. |

FOREIGN PATENT DOCUMENTS

| | | |
|---|---|---|
| CN | 109474400 A | 3/2019 |
| EP | 3697014 A1 | 8/2020 |
| WO | 2020/019317 A1 | 1/2020 |

OTHER PUBLICATIONS

JP Office Action for JP Application No. 2023-539788, mailed on Oct. 29, 2024 with English Translation.

(Continued)

*Primary Examiner* — Jung Liu

(57) ABSTRACT

Embodiments of the present disclosure relate to methods, devices and computer readable media of communication. A terminal device receives, from a network device, a scheduling for a set of PUSCH transmissions in DCI, determines a first subset of SRS resources in a first SRS resource set and a second subset of SRS resources in a second SRS resource set, at most one of the first subset of SRS resources and the second subset of SRS resources comprising no SRS resource, and transmit, to a network device, the set of PUSCH transmissions based on the at least one of the first subset of SRS resources and the second subset of SRS resources. In this way, single DCI based multi-TRP PUSCH repetition scheme is provided with reduced overhead and increased flexibility.

20 Claims, 4 Drawing Sheets

(56) References Cited

OTHER PUBLICATIONS

"Feature lead summary on [101-c-NR-cMIMO-ULFPTx-02]", Moderator (Vivo), 3GPP TSG RAN WG1 #101, R1-2004798, Jun. 5, 2020.
International Search Report for PCT/CN2020/140827 dated Sep. 28, 2021.
Extended European Search Report for EP Application No. 20967399.5, dated on Jan. 30, 2024.
Zte et al., "Remaining details on non-codebook based UL transmission", 3GPP TSG RAN WG1 Meeting AH 1801 R1-1800107, Jan. 13, 2018, pp. 1-pp. 5.

METHOD, DEVICE AND COMPUTER READABLE STORAGE MEDIUM OF COMMUNICATION

This Application is a National Stage of International Application No. PCT/CN2020/140827 filed Jun. 29, 2020.

TECHNICAL FIELD

Embodiments of the present disclosure generally relate to the field of telecommunication, and in particular, to methods, devices and computer readable storage media for physical uplink shared channel (PUSCH) repetitions.

BACKGROUND

Multi-input multi-output (MIMO) systems may include features that facilitate utilization of a large number of antenna elements at a base station for both sub-6 GHZ and over-6 GHz frequency bands. In the third generation partnership project (3GPP) Release-17, channels other than physical downlink shared channel (PDSCH) can benefit from multi-transmission and reception point (TRP) transmission (as well as multi-panel reception) which also includes multi-TRP for inter-cell operations. A scheduling of PUSCH transmissions in DCI (i.e., repetitions on PUSCH) need to be further studied.

SUMMARY

In general, example embodiments of the present disclosure provide method, device and computer readable storage medium of communication for PUSCH repetitions.

In a first aspect, there is provided a method of communication. The method comprises: receiving, at a terminal device and from a network device, a scheduling for a set of PUSCH transmissions in downlink control information (DCI); determining a first subset of sounding reference signal (SRS) resources in a first SRS resource set and a second subset of SRS resources in a second SRS resource set, at most one of the first subset of SRS resources and the second subset of SRS resources comprising no SRS resource; and transmitting, to a network device, the set of PUSCH transmissions based on the at least one of the first subset of SRS resources and the second subset of SRS resources.

In a second aspect, there is provided a method of communication. The method comprises: transmitting, at a network device and to a terminal device, a scheduling for a set of PUSCH transmissions in DCI; and receiving, from the terminal device, the set of PUSCH transmissions processed based on at least one of a first subset of SRS resources in a first SRS resource set and a second subset of SRS resources in a second SRS resource set, at most one of the first subset of SRS resources and the second subset of SRS resources comprising no SRS resource.

In a third aspect, there is provided a terminal device. The terminal device comprises a processor configured to perform the method according to the first aspect of the present disclosure.

In a fourth aspect, there is provided a network device. The network device comprises a processor configured to perform the method according to the second aspect of the present disclosure.

In a fifth aspect, there is provided a computer readable storage medium having instructions stored thereon. The instructions, when executed on at least one processor, cause the at least one processor to perform the method according to the first aspect of the present disclosure.

In a sixth aspect, there is provided a computer readable storage medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
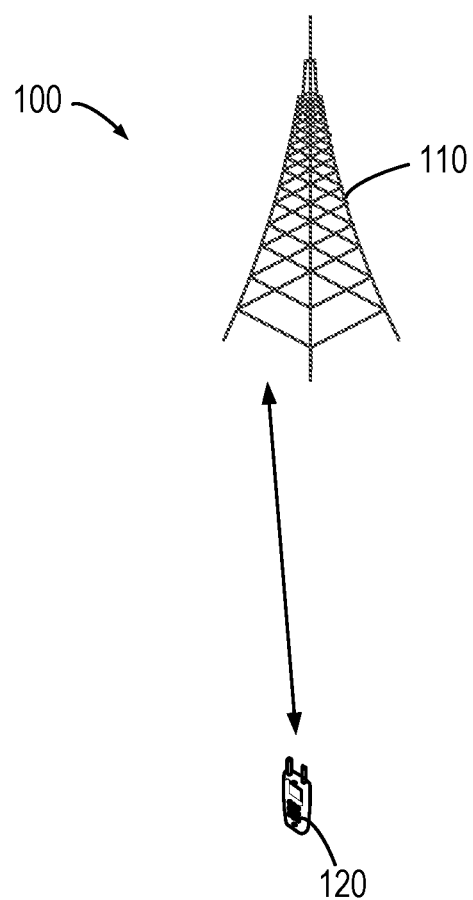
FIG. 1 illustrates an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term 'terminal device' refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an evolved NodeB (eNodeB or eNB), a next generation NodeB (gNB), a transmission reception point (TRP), a remote radio unit (RRU), a radio head (RH), a remote radio head (RRH), a low power node such as a femto node, a pico node, and the like.

As used herein, the term 'network device' or 'base station (BS)' refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Remote Radio Unit (RRU), a radio head (RH), a remote radio head (RRH), a low power node such as a femto node, a pico node, and the like.

As used herein, the term 'TRP' refers to an antenna array (with one or more antenna elements) available to the network device located at a specific geographical location. For example, a network device may be coupled with multiple TRPs in different geographical locations to achieve better coverage.

In one embodiment, the terminal device may be connected with a first network device and a second network device. One of the first network device and the second network device may be a master node and the other one may be a secondary node. The first network device and the second network device may use different RATs. In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

Enhancement on support for multi-TRP deployment targeting both frequency range (FR)1 and FR2 has been studied. In particular, it has been agreed to identify and specify features to improve reliability and robustness for channels other than PDSCH (that is, physical downlink control channel (PDCCH), PUSCH, and physical uplink control channel (PUCCH)) using multi-TRP and/or multi-panel, with Rel.16 reliability features as the baseline. To identify and specify features to enable inter-cell multi-TRP operations also can be considered. To evaluate and, if needed, specify enhancements for simultaneous multi-TRP transmission with multi-panel reception also can be considered.

For single DCI based multi-TRP PUSCH repetition schemes, non-codebook based PUSCH transmission may be enhanced to increase the maximum number of SRS resource sets to two, and associated channel state information-reference signal (CSI-RS) resource can be configured per SRS resource set. Further, codebook based PUSCH transmission may be enhanced to support an indication of two SRS resource indicators (SRIs) and increase the maximum number of SRS resource sets to two. However, how to indicate the two SRIs are not considered, e.g., considering the overhead and flexibility, or considering flexibility for dynamic switching between single-TRP and multi-TRP transmissions.

In view of this, embodiments of the present disclosure provide a solution for single DCI based multi-TRP PUSCH repetition schemes. Principles and implementations of the present disclosure will be described in detail below with reference to the figures.

Example of Communication Network

FIG. 1 illustrates an example communication network 100 in which embodiments of the present disclosure can be implemented. As shown in FIG. 1, the network 100 includes a network device 110, which is coupled with two TRPs/panels. The network 100 also includes a terminal device 120 served by the network device 110. It is to be understood that the number of network devices, terminal devices and TRPs as shown in FIG. 1 is only for the purpose of illustration without suggesting any limitations. The network 200 may include any suitable number of devices and TRPs adapted for implementing embodiments of the present disclosure.

As shown in FIG. 1, the network device 110 may communicate with the terminal device 120 via one or more TRPs. Each of the TRPs may provide a plurality of beams for communication with the terminal device 120.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In some scenarios, the network device 110 may schedule multiple PUSCH transmissions in single DCI for repetitions on PUSCH. Accordingly, the terminal device 120 may transmit the multiple PUSCH transmissions to the network device 110 via TRPs. In some embodiments, the terminal device 120 may be configured with a first SRS resource set and a second SRS resource set. The terminal device 120 may select one or more SRS resources from the first and second SRS resource sets, and determine its PUSCH transmission precoder based on the one or more SRS resources. In this way, the multiple PDSCH transmissions can be transmitted to the network device 110 based on the precoder. The selection of the one or more resources may consider the overhead and flexibility, for example, flexibility for dynamic switching between single-TRP and multi-TRP transmissions. This will be described in detail with reference to FIG. 2 below.

Example Implementation of SRS Resource Selection

Figure 2:
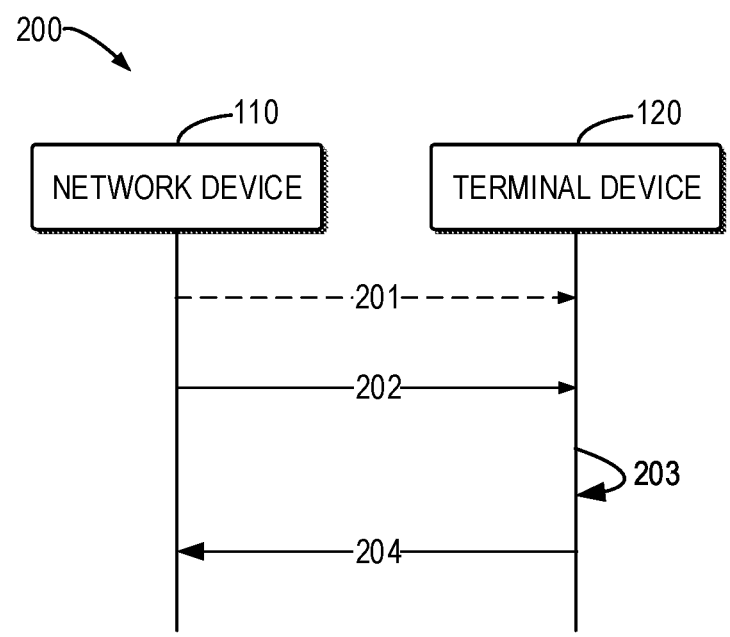
FIG. 2 illustrates a schematic diagram illustrating a process for communication during a scheduling of PUSCH transmissions in DCI according to some embodiments of the present disclosure.

FIG. 2 illustrates a schematic diagram illustrating a process 200 for communication during a scheduling of PUSCH transmissions in DCI according to some embodiments of the present disclosure. For the purpose of discussion, the process 200 will be described with reference to FIG. 1. The process 200 may involve the network device 110 and the terminal device 120 as illustrated in FIG. 1.

As shown in FIG. 2, the network device 110 may transmit 201, to the terminal device 120, resource configuration information associated with the first and second SRS resource sets (also referred to as set A and set B respectively). In some embodiments, the first SRS resource set may be associated with the first TRP, and the second SRS resource set may be associated with the second TRP. In some embodiments, the network device 110 may transmit the resource configuration information via a radio resource control (RRC) signaling. In some embodiments, the network device 110 may transmit the resource configuration information via a media access control control element (MAC CE). In some embodiments, the network device 110 may transmit the resource configuration information via DCI. Of course, any other suitable ways are also feasible.

In some embodiments, the network device 110 may also transmit, to the terminal device 120, an indication indicating one or more resources selected from the first and second SRS resource sets. For example, the selected one or more resources may be associated with both the first and second TRPs. In some embodiments, the network device 110 may also transmit the indication via at least one of RRC signaling, MAC CE or DCI. In this way, a subset of available SRIs for the first and second SRS resource sets may be defined or configured. Thus, the number of bits for the SRI field can be further reduced, and thus the signaling overhead in DCI can be saved.

In some embodiments, in set A, there are $N_{SRS\_a}$ SRS resources, and in set B, there are $N_{SRS\_b}$ SRS resources. $N_{SRS\_a}$ and $N_{SRS\_b}$ are positive integers, $1 \leq N_{SRS\_a} \leq 4$, and $1 \leq N_{SRS\_b} \leq 4$. In this way, the terminal device 120 can be configured with two SRS resource sets, i.e., set A and set B. In some embodiments, the value of $N_{SRS\_a}$ and the value of $N_{SRS\_b}$ may be different. In some embodiments, the value of $N_{SRS\_a}$ and the value of $N_{SRS\_b}$ may be same.

In some embodiments, the terminal device 120 may be configured with single DCI based multi-TRP PUSCH repetition schemes. For example, the terminal device 120 may be configured with a parameter/configuration which indicates the schemes. In some embodiments, the terminal device 120 may be configured with a plurality of PUSCH transmissions/repetitions (e.g., with a first number of PUSCH transmissions/repetitions). Assuming that the first number is denoted as M. In some embodiments, M is a positive integer. For example, $1 <= M <= 32$. For another example, $M \in \{1, 2, 4, 8, 16, 32\}$.

In some embodiments, if $M \geq 2$, there may be two sets of PUSCH transmissions/repetitions for the plurality of PUSCH transmissions/repetitions (e.g., set 1 and set 2), and set 1 with a second number of PUSCH transmissions/repetitions (second number is M1, M1 is a positive integer, e.g. M1=M/2 or M1=ceil(M/2) or M1-floor(M/2)), and set 2 with a third number of PUSCH transmissions/repetitions (third number is M2, and M2=M−M1).

In some embodiments, for repetitions on PUSCH, the network device 110 may transmit 202, to the terminal device 120, a scheduling for a set of PUSCH transmissions in single DCI. In some embodiments, the single DCI may comprise a first SRI field (also referred to as a first field herein) and a second SRI field (also referred to as a second field herein). The first SRI field indicates a first index associated with a first SRI for a first subset of SRS resources in the first SRS resource set. The second SRI field indicates a second index associated with a second SRI for a second subset of SRS resources in the second SRS resource set. In these embodiments, at most one of the first and second SRIs may indicate that there is no SRS resource in the corresponding SRS resource set. For example, the first index or the second index may indicate "N/A" or "reserved". In this way, the indicated "N/A" or "reserved" is to indicate there is no SRS resource in the corresponding SRS resource set.

In some alternative embodiments, the DCI may comprise only one SRI field (also referred to as a third field herein) indicating a third index. In some embodiments, the third index may be only associated with the first SRI for the first subset of SRS resources. In some embodiments, the third index may be only associated with the second SRI for the second subset of SRS resources.

In some embodiments, the third index may be associated with both the first SRI for the first subset of SRS resources and the second SRI for the second subset of SRS resources. In some alternative embodiments, the third index may be associated with one SRI (also referred to as a third SRI herein) for both the first subset of SRS resources and the second subset of SRS resources.

In some alternative embodiments, the DCI may comprise no SRI field. For example, when there is only one SRS resource in each of the first and second SRS resource set, the DCI may comprise no SRI field.

In some embodiments, upon receiving the scheduling of the set of PUSCH transmissions in the DCI, the terminal device 120 may determine 203 the first subset of SRS resources in the first SRS resource set and the second subset of SRS resources in the second SRS resource set. In some embodiments where the DCI comprises no SRI field, for example, each of the first and second SRS resource sets comprises only one resource, the terminal device 120 may determine the first subset comprising the one resource in the first SRS resource set, and may determine the second subset comprising the one resource in the second SRS resource set.

In some embodiments where the DCI comprises the first SRI field and the second SRI field, the terminal device 120 may determine the number of bits (also referred to as a first number of bits) in the first SRI field, and determine the first SRI field from the DCI based on the first number of bits. The terminal device 120 may determine the number of bits (also referred to as a second number of bits) in the second SRI field, and determine the second SRI field from the DCI based on the second number of bits. Then, the terminal device 120 may determine the first subset of SRS resources based on the first SRI, and determine the second subset of SRS resources based on the second SRI. This will be detailed in connection with Embodiments 1 to 2 below.

In some embodiments, the terms "transmission", "transmission occasion" and "repetition" may be used interchangeably. The terms "precoder", "precoding", "precoding matrix", "beam", "spatial relation information" and "spatial relation" may be used interchangeably.

In some embodiments, the set of PUSCH transmissions comprises a first subset of PUSCH transmissions and a second subset of PUSCH transmissions. In some embodiments, the precoder for the first subset of PUSCH transmissions/repetitions may be determined based on the first SRI indicated by the first SRI field, TPMI (e.g. first TPMI) and the transmission rank. In some embodiments, the precoder for the second subset of PUSCH transmissions/repetitions may be determined based on the second SRI indicated by the second SRI field, TPMI (e.g. second TPMI) and the transmission rank. In some embodiments, the precoder for the first subset of PUSCH transmissions/repetitions may be determined based on the first subset of SRS resources, TPMI (e.g. first TPMI) and the transmission rank. In some embodiments, the precoder for the second subset of PUSCH transmissions/repetitions may be determined based on the second subset of SRS resources, TPMI (e.g. second TPMI) and the transmission rank.

In some embodiments, the first SRI field (for example, one codepoint or one value of bit field mapped to index in the first SRI field) may indicate the first subset comprising no SRS resource. In some embodiments, the first SRI field (for example, one codepoint or one value of bit field mapped to index in the first SRI field) may indicate no SRS resource determined for the first subset of SRS resources. In some embodiments, the first SRI field (for example, one codepoint or one value of bit field mapped to index in the first SRI field) may indicate no SRS resource determined in the first SRS resource set. In some embodiments, the first SRI field (for example, one codepoint or one value of bit field mapped to index in the first SRI field) may indicate the set of PUSCH transmissions or the first subset of PUSCH transmissions is not based on the first SRI and/or the TPMI (e.g. the first TPMI). In some embodiments, the first SRI field (for example, one codepoint or one value of bit field mapped to index in the first SRI field) may indicate that the terminal device transmits the set of PUSCH transmissions based on the second SRI and the TPMI (e.g. the second TPMI) and the transmission rank. In some embodiments, the first SRI field (for example, one codepoint or one value of bit field mapped to index in the first SRI field) may indicate that the terminal device transmits only the second subset of PUSCH transmissions in the set of PUSCH transmissions, and the second subset of PUSCH transmissions is based on the second SRI and the TPMI (e.g. the second TPMI) and the transmission rank. In some embodiments, the first SRI field (for example, one codepoint or one value of bit field mapped to index in the first SRI field) may indicate that the terminal device does not transmit the first subset of PUSCH transmissions. In some embodiments, the first SRI field (for example, one codepoint or one value of bit field mapped to index in the first SRI field) may indicate that the terminal device only transmits one PUSCH transmission (for example, the first PUSCH transmission) in the set of PUSCH transmissions. In some embodiments, the first SRI field (for example, one codepoint or one value of bit field mapped to index in the first SRI field) may indicate that the terminal device does not transmit or the terminal device omits the set of PUSCH transmissions scheduled by the DCI. In some embodiments, the codepoint or the value of bit field mapped to index in the first SRI field may be "N/A" or "reserved". In some embodiments, the second SRI is indicated in the second SRI field.

In some embodiments, the second SRI field (for example, one codepoint or one value of bit field mapped to index in the second SRI field) may indicate the second subset comprising no SRS resource. In some embodiments, the second SRI field (for example, one codepoint or one value of bit field mapped to index in the second SRI field) may indicate no SRS resource determined for the second subset of SRS resources. In some embodiments, the second SRI field (for example, one codepoint or one value of bit field mapped to index in the second SRI field) may indicate no SRS resource determined in the second SRS resource set. In some embodiments, the second SRI field (for example, one codepoint or one value of bit field mapped to index in the second SRI field) may indicate the set of PUSCH transmissions or the second subset of PUSCH transmissions is not based on the second SRI and/or the TPMI (e.g. the second TPMI). In some embodiments, the second SRI field (for example, one codepoint or one value of bit field mapped to index in the second SRI field) may indicate that the terminal device transmits the set of PUSCH transmissions based on the first SRI and the TPMI (e.g. the first TPMI) and the transmission rank. In some embodiments, the second SRI field (for example, one codepoint or one value of bit field mapped to index in the second SRI field) may indicate that the terminal device transmits only the first subset of PUSCH transmissions in the set of PUSCH transmissions, and the first subset of PUSCH transmissions is based on the first SRI and the TPMI (e.g. the first TPMI) and the transmission rank. In some embodiments, the second SRI field (for example, one codepoint or one value of bit field mapped to index in the second SRI field) may indicate that the terminal device does not transmit the second subset of PUSCH transmissions. In some embodiments, the second SRI field (for example, one codepoint or one value of bit field mapped to index in the second SRI field) may indicate that the terminal device only transmits one PUSCH transmission (for example, the first PUSCH transmission) in the set of PUSCH transmissions. In some embodiments, the second SRI field (for example, one codepoint or one value of bit field mapped to index in the second SRI field) may indicate that the terminal device does not transmit or the terminal device omits the set of PUSCH transmissions scheduled by the DCI. In some embodiments, the codepoint or the value of bit field mapped to index in the second SRI field may be "N/A" or "reserved". In some embodiments, the first SRI is indicated by the first SRI field.

In some embodiments, at most one of the first SRI field and the second SRI field may indicate no SRS resource determined. In some embodiments, at most one of the first SRI field and the second SRI field may indicate "N/A" or "reserved". In some embodiments, at most one of the first SRI field and the second SRI field may indicate embodiments as described in embodiment [0047] and embodiment [0048]. In some embodiments, at least one of the first SRI field and the second SRI field indicate at least one SRS resource in the first SRS resource set and/or the second SRS resource set.

Embodiment 1

In this embodiment, codebook based uplink transmission is described. In some embodiments, for the codebook based uplink transmission, the first number of bits (or number of codepoints not "reserved", denoted as Ba herein) for the first SRI field may depend on the number of SRS resources in the first SRS resource set plus one (e.g., codepoint for N/A). For example, the terminal device 120 may determine the first number of bits Ba by the equation (1).

$$Ba = \lceil \log_2(N_{SRS\_a}+1) \rceil \quad (1)$$

where $N_{SRS\_a}$ denotes the number of SRS resources in the first SRS resource set. It should be noted that this equation is merely an example, and any other suitable forms are also feasible.

In some embodiments, upon decoding the first field from the DCI based on the first number of bits, the terminal device 120 may determine the first subset of SRS resources based on a mapping from the first index to the first SRI. For illustration, some examples of the mapping from the first index to the first SRI are shown in Tables 1A to 1D below.

TABLE 1A

An example of a mapping from first index to first SRI in case of $N_{SRS\_a} = 1$

| Bit field mapped to index (the first index) | SRI(s), $N_{SRS\_a} = 1$ (the first SRI) | Or SRI(s), $N_{SRS\_a} = 1$ (the first SRI) |
|---|---|---|
| 0 | 0 | N/A or Reserved |
| 1 | N/A or Reserved | 0 |

TABLE 1B

An example of a mapping from first index to first SRI in case of $N_{SRS\_a} = 2$

| Bit field mapped to index (the first index) | SRI(s), $N_{SRS\_a} = 2$ (the first SRI) | Or SRI(s), $N_{SRS\_a} = 2$ (the first SRI) |
|---|---|---|
| 0 | 0 | N/A or Reserved |
| 1 | 1 | 0 |
| 2 | N/A or Reserved | 1 |
| 3 | Reserved | Reserved |

TABLE 1C

An example of a mapping from first index to first SRI in case of $N_{SRS\_a} = 3$

| Bit field mapped to index (the first index) | SRI(s), $N_{SRS\_a} = 3$ (the first SRI) | Or SRI(s), $N_{SRS\_a} = 3$ (the first SRI) |
|---|---|---|
| 0 | 0 | N/A or Reserved |
| 1 | 1 | 0 |
| 2 | 2 | 1 |
| 3 | N/A or Reserved | 2 |

TABLE 1D

An example of a mapping from first index to first SRI in case of $N_{SRS\_a} = 4$

| Bit field mapped to index (the first index) | SRI(s), $N_{SRS\_a} = 4$ (the first SRI) | Or SRI(s), $N_{SRS\_a} = 4$ (The first SRI) |
|---|---|---|
| 0 | 0 | N/A or Reserved |
| 1 | 1 | 0 |
| 2 | 2 | 1 |
| 3 | 3 | 2 |
| 4 | N/A or Reserved | 3 |
| 5-7 | Reserved | Reserved |

It is to be understood that the above examples shown in Tables 1A to 1D are merely for illustration, and do not make limitation for the present disclosure. In some embodiments, a subset of columns and/or a subset of rows in Tables 1A to 1D may be used. In some embodiments, only one of the second column and the third column in Tables 1A to 1D may be used.

In some alternative embodiments, the first number of bits (or number of codepoints not "reserved") for the first SRI field may depend on the number of SRS resources in the first SRS resource set. In this embodiment, One SRS resource should be indicated in the first SRI field. For example, the first TRP should be assumed for PUSCH transmissions/repetitions.

For example, the terminal device 120 may determine the first number of bits Ba by the equation (2).

$$Ba = \lceil \log_2(N_{SRS\_a}) \rceil \qquad (2)$$

where $N_{SRS\_a}$ denotes the number of SRS resources in the first SRS resource set. It should be noted that this equation is merely an example, and any other suitable forms are also feasible.

In some embodiments, upon decoding the first field from the DCI based on the first number of bits, the terminal device 120 may determine the first subset of SRS resources based on a mapping from the first index to the first SRI. For illustration, some examples of the mapping from the first index to the first SRI are shown in Tables 2A to 2C below. In some embodiment where $N_{SRS\_a}=1$ and Ba=0, the first SRI field may be omitted.

TABLE 2A

An example of a mapping from first index to first SRI in case of $N_{SRS\_a} = 2$

| Bit field mapped to index (the first index) | SRI(s), $N_{SRS\_a} = 2$ (the first SRI) |
|---|---|
| 0 | 0 |
| 1 | 1 |

TABLE 2B

An example of a mapping from first index to first SRI in case of $N_{SRS\_a} = 3$

| Bit field mapped to index (the first index) | SRI(s), $N_{SRS\_a} = 3$ (the first SRI) |
|---|---|
| 0 | 0 |
| 1 | 1 |
| 2 | 2 |
| 3 | Reserved |

TABLE 2C

An example of a mapping from first index to first SRI in case of $N_{SRS\_a} = 4$

| Bit field mapped to index (the first index) | SRI(s), $N_{SRS\_a} = 4$ (the first SRI) |
|---|---|
| 0 | 0 |
| 1 | 1 |
| 2 | 2 |
| 3 | 3 |

It is to be understood that the above examples shown in Tables 2A to 2C are merely for illustration, and do not make limitation for the present disclosure. In some embodiments, a subset of columns and/or a subset of rows in Tables 2A to 2C may be used.

In some embodiments, the second number of bits (or number of codepoints not "reserved", denoted as Bb herein) for the second SRI field may depend on the number of SRS resources in the second SRS resource set +1. For example, the terminal device 120 may determine the second number of bits Bb by the equation (3).

$$Bb = \lceil \log_2(N_{SRS\_b}+1) \rceil \qquad (3)$$

where $N_{SRS\_b}$ denotes the number of SRS resources in the second SRS resource set. It should be noted that this equation is merely an example, and any other suitable forms are also feasible.

In some embodiments, upon decoding the second field from the DCI based on the second number of bits, the terminal device 120 may determine the second subset of SRS resources based on a mapping from the second index to the second SRI. For illustration, some examples of the mapping from the second index to the second SRI are shown in Tables 3A to 3D below.

TABLE 3A

An example of a mapping from second index to second SRI in case of $N_{SRS\_b} = 1$

| Bit field mapped to index (the second index) | SRI(s), $N_{SRS\_b} = 1$ (the second SRI) | Or SRI(s), $N_{SRS\_b} = 1$ (the second SRI) |
|---|---|---|
| 0 | 0 or the single SRS resource in the second set | N/A or Reserved |
| 1 | N/A or Reserved | 0 |

TABLE 3B

An example of a mapping from second index to second SRI in case of $N_{SRS\_b} = 2$

| Bit field mapped to index (the second index) | SRI(s), $N_{SRS\_b} = 2$ (the second SRI) | Or SRI(s), $N_{SRS\_b} = 2$ (the second SRI) |
|---|---|---|
| 0 | 0 | N/A or Reserved |
| 1 | 1 | 0 |
| 2 | N/A or Reserved | 1 |
| 3 | Reserved | Reserved |

TABLE 3C

An example of a mapping from second index to second SRI in case of $N_{SRS\_b} = 3$

| Bit field mapped to index (the second index) | SRI(s), $N_{SRS\_b} = 3$ (the second SRI) | Or SRI(s), $N_{SRS\_b} = 3$ (the second SRI) |
|---|---|---|
| 0 | 0 | N/A or Reserved |
| 1 | 1 | 0 |
| 2 | 2 | 1 |
| 3 | N/A or Reserved | 2 |

TABLE 3D

An example of a mapping from second index to second SRI in case of $N_{SRS\_b} = 4$

| Bit field mapped to index (the second index) | SRI(s), $N_{SRS\_b} = 4$ (the second SRI) | Or SRI(s), $N_{SRS\_b} = 4$ (the second SRI) |
|---|---|---|
| 0 | 0 | N/A or Reserved |
| 1 | 1 | 0 |
| 2 | 2 | 1 |
| 3 | 3 | 2 |
| 4 | N/A or Reserved | 3 |
| 5-7 | Reserved | Reserved |

It is to be understood that the above examples shown in Tables 3A to 3D are merely for illustration, and do not make limitation for the present disclosure. In some embodiments, a subset of columns and/or a subset of rows in Tables 3A to 3D may be used. In some embodiments, only one of the second column and the third column in Tables 3A to 3D may be used.

Embodiment 2

In this embodiment, non-codebook based uplink transmission is described. In some embodiments, for the non-codebook based uplink transmission, the first number of bits (or number of codepoints not "reserved", denoted as Ba herein) for the first SRI field may depend on the maximum number of layers for the set of PUSCH transmissions and the number of SRS resources in the first SRS resource set plus one (e.g., codepoint for N/A). For example, the terminal device 120 may determine the first number of bits Ba by the equation (4).

$$Ba = \left\lceil \log_2\left(\sum_{k=1}^{min(L_{max}, N_{SRS\_a})} \binom{N_{SRS\_a}}{k} + 1\right)\right\rceil \quad (4)$$

where $N_{SRS\_a}$ denotes the number of SRS resources in the first SRS resource set, and $L_{max}$ denotes the maximum number of layers for the set of PUSCH transmissions. It should be noted that this equation is merely an example, and any other suitable forms are also feasible.

In some alternative embodiments, for the non-codebook based uplink transmission, the first number of bits (or number of codepoints not "reserved", denoted as Ba herein) for the first SRI field may depend on the maximum number of layers for the set of PUSCH transmissions and the number of SRS resources in the first SRS resource set. For example, the terminal device 120 may determine the first number of bits Ba by the equation (5).

$$Ba = \left\lceil \log_2\left(\sum_{k=1}^{min(L_{max}, N_{SRS\_a})} \binom{N_{SRS\_a}}{k}\right)\right\rceil \quad (5)$$

where $N_{SRS\_a}$ denotes the number of SRS resources in the first SRS resource set, and $L_{max}$ denotes the maximum number of layers for the set of PUSCH transmissions. It should be noted that this equation is merely an example, and any other suitable forms are also feasible. In these embodiments, at least one SRS resource should be indicated in the first SRI field, or in other words, the first TRP should be assumed for PUSCH transmissions/repetitions.

In some embodiments, upon decoding the first field from the DCI based on the first number of bits, the terminal device 120 may determine the first subset of SRS resources based on a mapping from the first index to the first SRI. For illustration, some examples of the mapping from the first index to the first SRI are shown in Tables 4A to 4D below. In some embodiment where $N_{SRS\_a}=1$ and Ba=0, the first SRI field may be omitted.

TABLE 4A

An example of a mapping from first index to first SRI in case of $L_{max} = 1$

| Bit field mapped to index (the first index) | SRI(s), $N_{SRS\_a} = 2$ (the first SRI) | Bit field mapped to index (the first index) | SRI(s), $N_{SRS\_a} = 3$ (the first SRI) | Bit field mapped to index (the first index) | SRI(s), $N_{SRS\_a} = 4$ (the first SRI) |
| --- | --- | --- | --- | --- | --- |
| 0 | 0 | 0 | 0 | 0 | 0 |
| 1 | 1 | 1 | 1 | 1 | 1 |
|   |   | 2 | 2 | 2 | 2 |
|   |   | 3 | reserved | 3 | 3 |

TABLE 4B

An example of a mapping from first index to first SRI in case of $L_{max} = 2$

| Bit field mapped to index (the first index) | SRI(s), $N_{SRS\_a} = 2$ (the first SRI) | Bit field mapped to index (the first index) | SRI(s), $N_{SRS\_a} = 3$ (the first SRI) | Bit field mapped to index (the first index) | SRI(s), $N_{SRS\_a} = 4$ (the first SRI) |
| --- | --- | --- | --- | --- | --- |
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6-7 | reserved | 6 | 0, 3 |
|   |   |   |   | 7 | 1, 2 |
|   |   |   |   | 8 | 1, 3 |
|   |   |   |   | 9 | 2, 3 |
|   |   |   |   | 10-15 | reserved |

TABLE 4C

An example of a mapping from first index to first SRI in case of $L_{max} = 3$

| Bit field mapped to index (the first index) | SRI(s), $N_{SRS\_a} = 2$ (the first SRI) | Bit field mapped to index (the first index) | SRI(s), $N_{SRS\_a} = 3$ (the first SRI) | Bit field mapped to index (the first index) | SRI(s), $N_{SRS\_a} = 4$ (the first SRI) |
| --- | --- | --- | --- | --- | --- |
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14-15 | reserved |

TABLE 4D

An example of a mapping from first index to first SRI in case of $L_{max} = 4$

| Bit field mapped to index (the first index) | SRI(s), $N_{SRS\_a} = 2$ (the first SRI) | Bit field mapped to index (the first index) | SRI(s), $N_{SRS\_a} = 3$ (the first SRI) | Bit field mapped to index (the first index) | SRI(s), $N_{SRS\_a} = 4$ (the first SRI) |
| --- | --- | --- | --- | --- | --- |
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14 | 0, 1, 2, 3 |
|   |   |   |   | 15 | reserved |

It is to be understood that the above examples shown in Tables 4A to 4D are merely for illustration, and do not make limitation for the present disclosure. In some embodiments, a subset of columns and/or a subset of rows in Tables 4A to 4D may be used.

In some embodiments, for the non-codebook based uplink transmission, the second number of bits (or number of codepoints not "reserved", denoted as Bb herein) for the second SRI field may depend on the maximum number of layers for the set of PUSCH transmissions and the number of SRS resources in the second SRS resource set. For example, the terminal device 120 may determine the second number of bits Bb by the equation (6).

$$Bb = \left\lceil \log_2\left(\sum_{k=1}^{min(L_{max},N_{SRS\_b})} \binom{N_{SRS\_b}}{k} + 1\right) \right\rceil \quad (6)$$

where $N_{SRS\_b}$ denotes the number of SRS resources in the second SRS resource set, and $L_{max}$ denotes the maximum number of layers for the set of PUSCH transmissions. It should be noted that this equation is merely an example, and any other suitable forms are also feasible.

In some embodiments, upon decoding the second field from the DCI based on the second number of bits, the terminal device 120 may determine the second subset of SRS resources based on a mapping from the second index to the second SRI. For illustration, some examples of the mapping from the first/second index to the first/second SRI are shown in Tables 5A to 5D below. In this embodiment, $N_{SRS}$ can be either $N_{SRS\_a}$ or $N_{SRS\_b}$.

TABLE 5A

An example of a mapping from first/second index to first/second SRI in case of $L_{max} = 1$

| Bit field mapped to index (first/second index) | SRI (s), $N_{SRS} = 1$ (first/second SRI) | Bit field mapped to index (first/second index) | SRI (s), $N_{SRS} = 2$ (first/second SRI) | Bit field mapped to index (first/second index) | SRI (s), $N_{SRS} = 3$ (first/second SRI) | Bit field mapped to index (first/second index) | SRI (s), $N_{SRS} = 4$ (first/second SRI) |
|---|---|---|---|---|---|---|---|
| 0 | 0 | 0 | 0 | 0 | 0 | 0 | 0 |
| 1 | N/A or reserved | 1 | 1 | 1 | 1 | 1 | 1 |
|   |   | 2 | N/A or reserved | 2 | 2 | 2 | 2 |
|   |   | 3 | reserved | 3 | N/A or reserved | 3 | 3 |
|   |   |   |   |   |   | 4 | N/A or reserved |
|   |   |   |   |   |   | 5-7 | reserved |

TABLE 5B

An example of a mapping from first/second index to first/second SRI in case of $L_{max} = 2$

| Bit field mapped to index | SRI(s), $N_{SRS} = 1$ | Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|---|---|
| 0 | 0 | 0 | 0 | 0 | 0 | 0 | 0 |
| 1 | N/A or reserved | 1 | 1 | 1 | 1 | 1 | 1 |
|   |   | 2 | 0, 1 | 2 | 2 | 2 | 2 |
|   |   | 3 | N/A or reserved | 3 | 0, 1 | 3 | 3 |
|   |   |   |   | 4 | 0, 2 | 4 | 0, 1 |
|   |   |   |   | 5 | 1, 2 | 5 | 0, 2 |
|   |   |   |   | 6 | N/A or reserved | 6 | 0, 3 |
|   |   |   |   | 7 | reserved | 7 | 1, 2 |
|   |   |   |   |   |   | 8 | 1, 3 |
|   |   |   |   |   |   | 9 | 2, 3 |
|   |   |   |   |   |   | 10 | N/A or reserved |
|   |   |   |   |   |   | 11-15 | reserved |

TABLE 5C

An example of a mapping from first/second index to first/second SRI in case of $L_{max} = 3$

| Bit field mapped to index (first/second index) | SRI (s), $N_{SRS} = 1$ (first/second SRI) | Bit field mapped to index (first/second index) | SRI (s), $N_{SRS} = 2$ (first/second SRI) | Bit field mapped to index (first/second index) | SRI (s), $N_{SRS} = 3$ (first/second SRI) | Bit field mapped to index (first/second index) | SRI (s), $N_{SRS} = 4$ (first/second SRI) |
|---|---|---|---|---|---|---|---|
| 0 | 0 | 0 | 0 | 0 | 0 | 0 | 0 |
| 1 | N/A or reserved | 1 | 1 | 1 | 1 | 1 | 1 |
|   |   | 2 | 0, 1 | 2 | 2 | 2 | 2 |
|   |   | 3 | N/A or reserved | 3 | 0, 1 | 3 | 3 |
|   |   |   |   | 4 | 0, 2 | 4 | 0, 1 |
|   |   |   |   | 5 | 1, 2 | 5 | 0, 2 |
|   |   |   |   | 6 | 0, 1, 2 | 6 | 0, 3 |
|   |   |   |   | 7 | N/A or reserved | 7 | 1, 2 |
|   |   |   |   |   |   | 8 | 1, 3 |
|   |   |   |   |   |   | 9 | 2, 3 |
|   |   |   |   |   |   | 10 | 0, 1, 2 |
|   |   |   |   |   |   | 11 | 0, 1, 3 |
|   |   |   |   |   |   | 12 | 0, 2, 3 |

TABLE 5C-continued

An example of a mapping from first/second index to first/second SRI in case of $L_{max} = 3$

| Bit field mapped to index (first/second index) | SRI (s), $N_{SRS} = 1$ (first/second SRI) | Bit field mapped to index (first/second index) | SRI (s), $N_{SRS} = 2$ (first/second SRI) | Bit field mapped to index (first/second index) | SRI (s), $N_{SRS} = 3$ (first/second SRI) | Bit field mapped to index (first/second index) | SRI (s), $N_{SRS} = 4$ (first/second SRI) |
| --- | --- | --- | --- | --- | --- | --- | --- |
| | | | | | | 13 | 1, 2, 3 |
| | | | | | | 14 | N/A or reserved |
| | | | | | | 15 | N/A |

TABLE 5D

An example of a mapping from first/second index to first/second SRI in case of $L_{max} = 4$

| Bit field mapped to index (first/second index) | SRI (s), $N_{SRS} = 1$ (first/second SRI) | Bit field mapped to index (first/second index) | SRI (s), $N_{SRS} = 2$ (first/second SRI) | Bit field mapped to index (first/second index) | SRI (s), $N_{SRS} = 3$ (first/second SRI) | Bit field mapped to index (first/second index) | SRI (s), $N_{SRS} = 4$ (first/second SRI) |
| --- | --- | --- | --- | --- | --- | --- | --- |
| 0 | 0 | 0 | 0 | 0 | 0 | 0 | 0 |
| 1 | N/A or reserved | 1 | 1 | 1 | 1 | 1 | 1 |
| | | 2 | 0, 1 | 2 | 2 | 2 | 2 |
| | | 3 | N/A or reserved | 3 | 0, 1 | 3 | 3 |
| | | | | 4 | 0, 2 | 4 | 0, 1 |
| | | | | 5 | 1, 2 | 5 | 0, 2 |
| | | | | 6 | 0, 1, 2 | 6 | 0, 3 |
| | | | | 7 | N/A or reserved | 7 | 1, 2 |
| | | | | | | 8 | 1, 3 |
| | | | | | | 9 | 2, 3 |
| | | | | | | 10 | 0, 1, 2 |
| | | | | | | 11 | 0, 1, 3 |
| | | | | | | 12 | 0, 2, 3 |
| | | | | | | 13 | 1, 2, 3 |
| | | | | | | 14 | 0, 1, 2, 3 |
| | | | | | | 15 | N/A or reserved |

It is to be understood that the above examples shown in Tables 5A to 5D are merely for illustration, and do not make limitation for the present disclosure. In some embodiments, a subset of columns and/or a subset of rows in Tables 5A to 5D may be used.

In some embodiments, the number of ports for the SRS resource(s) in the first subset and the number of ports for the SRS resource(s) in the second subset are same.

In some embodiments, when the number of ports for the SRS resource(s) in the first subset indicated by the first SRI is R (R may be any one of $\{1, 2, 3, 4\}$). The SRS resource(s) in the second subset is determined at least based on the value of R.

In some embodiments, if the number of ports for the SRS resource in the first subset indicated by the first SRI is R (R may be any one of $\{1, 2, 3, 4\}$), the first value of the second SRI (e.g. value 0) indicates the first SRS resource with number of ports R. In some embodiments, if the number of ports for the SRS resource in the first subset indicated by the first SRI is R (R may be any one of $\{1, 2, 3, 4\}$), the second value of the second SRI (e.g. value 1) indicates the second SRS resource with number of ports R. For example, the number of SRS resources with number of ports R in the second SRS resource set is S. S is positive integer, and S is larger than 1. For example, S is any one of $\{2,3,4\}$. In some embodiments, if the number of ports for the SRS resource in the first subset indicated by the first SRI is R (R may be any one of $\{1, 2, 3, 4\}$), the third value of the second SRI (e.g. value 2) indicates the third SRS resource with number of ports R. For example, the number of SRS resources with number of ports R in the second SRS resource set is S. S is positive integer, and S is larger than 2. For example, S is any one of $\{3,4\}$. In some embodiments, if the number of ports for the SRS resource in the first subset indicated by the first SRI is R (R may be any one of $\{1, 2, 3, 4\}$), the fourth value of the second SRI (e.g. value 2) indicates the fourth SRS resource with number of ports R. For example, the number of SRS resources with number of ports R in the second SRS resource set is S. S is positive integer, and S is larger than 3. For example, S is 4. For example, the terminal device may be configured with codebook based uplink transmission.

In some embodiments, the number of SRS resource(s) in the first subset and the number of ports for the SRS resource(s) in the second subset are same.

In some embodiments, when the number of the SRS resource(s) in the first subset indicated by the first SRI is T (T may be any one of $\{1, 2, 3, 4\}$). The SRS resource(s) in the second subset is determined at least based on the value of T. In some embodiments, if the number of the SRS resource(s) in the first subset indicated by the first SRI is 1, the second SRI indicates one SRS resource from the SRS resource(s) in the second SRS resource set. In some embodiments, if the number of the SRS resource(s) in the first subset indicated by the first SRI is 2, the second SRI indicates two SRS resources from the SRS resource(s) in the second SRS resource set. For example, the number of SRS resources in the second SRS resource set is S. S is positive integer, and S is larger than 1. For example, S is any one of {2, 3, 4}. In some embodiments, if the number of the SRS resource(s) in the first subset indicated by the first SRI is 3, the second SRI indicates three SRS resources from the SRS resource(s) in the second SRS resource set. For example, the number of SRS resources in the second SRS resource set is S. S is positive integer, and S is larger than 2. For example, S is any one of {3,4}. In some embodiments, if the number of the SRS resource(s) in the first subset indicated by the first SRI is 4, the second SRI indicates four SRS resources from the SRS resource(s) in the second SRS resource set. For example, the number of SRS resources in the second SRS resource set is S. S is positive integer, and S is larger than 3. For example, S is 4. In some embodiments, if the number of the SRS resource(s) in the first subset indicated by the first SRI is 4, the second SRI indicates all the four SRS resources in the second SRS resource set. For example, the terminal device may be configured with codebook based uplink transmission.

In some embodiments, for codebook based uplink transmission or non-codebook based uplink transmission, the terminal device 120 may determine the second subset based on at least one of the number of ports for SRS resources in the first subset, the number of SRS resources in the first subset, the first index, the second index, a value of the first SRI, or a value of the second SRI. This will be described in connection with Embodiment 3 below.

Embodiment 3

In some embodiments, for codebook based uplink transmission, the terminal device 120 may determine the first number of bits Ba in the first SRI field by the equation (1) or (2), and determine the second number of bits Bb in the second SRI field based on the maximum number of SRS resources with a same number of ports in the second SRS resource set. For example, the terminal device may be configured with full power mode to be fullpowermode2.

For example, the terminal device 120 may determine the second number of bits Bb in the second SRI field by equation (7) below.

$$Bb = \lceil \log_2(\max(N_i)+1) \rceil \tag{7}$$

where i denotes an index for the number of SRS resources with $P_i$ ports in the second SRS resource set, and i=1, ... G, or i=0, ... G−1, where G denotes a total number of all different values of $P_i$, and $N_i$ denotes the number of SRS resources with $P_i$ ports in the second SRS resource set. It should be noted that this equation is merely an example, and any other suitable forms are also feasible.

As another example, the terminal device 120 may determine the second number of bits Bb in the second SRI field by equation (8) below.

$$Bb = \lceil \log_2(\max(N_i)) \rceil \tag{8}$$

where i denotes an index for the number of SRS resources with $P_i$ ports in the second SRS resource set, and i=1, ... G, or i=0, ... G−1, where G denotes a total number of all different values of $P_i$, and $N_i$ denotes the number of SRS resources with $P_i$ ports in the second SRS resource set. It should be noted that this equation is merely an example, and any other suitable forms are also feasible.

In some embodiments, for non-codebook based uplink transmission, the terminal device 120 may determine the first number of bits Ba in the first SRI field by the equation (4) or (5), and determine the second number of bits Bb in the second SRI field based on the maximum number of permutations selected from the SRS resources in the second SRS resource set for a number of layers k and the maximum number of layers for the set of PUSCH transmissions. For example, the terminal device may be configured with full power mode to be fullpowermode2.

For example, the terminal device 120 may determine the second number of bits Bb in the second SRI field by equation (9) below.

$$Bb = \left\lceil \log_2\left(\max\binom{N_{SRS\_b}}{k} + 1\right)\right\rceil \tag{9}$$

where k=1, ... min($L_{max}$, $N_{SRS\_b}$), $N_{SRS\_b}$ denotes the number of SRS resources in the second SRS resource set, and $L_{max}$ denotes the maximum number of layers for the set of PUSCH transmissions. It should be noted that this equation is merely an example, and any other suitable forms are also feasible. In this embodiment, at least one SRS resource should be indicated in the first and/or second SRI field. If at least one SRS resource indicated in the first field, the first TRP should be assumed for PUSCH transmissions/repetitions. For illustration, some examples of mapping from the second index to the second SRI are shown in Tables 6A to 6D below. In this example, $N_{SRS}$ is $N_{SRS\_b}$.

TABLE 6A

An example of a mapping from second index to second SRI in case of $L_{max} = 1$

| Bit field mapped to index | SRI(s), $N_{SRS} = 1$ | Bit field mapped to index | SRI(s), $N_{SRS} = 2$ | Bit field mapped to index | SRI(s), $N_{SRS} = 3$ | SRI(s), $N_{SRS} = 4$ |
|---|---|---|---|---|---|---|
| 0 | 0 | 0 | 0 | 0 | 0 | 0 |
| 1 | N/A or reserved | 1 | 1 | 1 | 1 | 1 |
|   |   | 2 | N/A or reserved | 2 | 2 | 2 |
|   |   | 3 | reserved | 3 | N/A or reserved | 3 |
|   |   |   |   |   |   | N/A or reserved |
|   |   |   |   |   | −7 | reserved |

TABLE 6B

An example of a mapping from second index to second SRI in case of $L_{max} = 2$

| Bit field mapped to index | SRI (s), $N_{SRS} = 1$ | Bit field mapped to index | SRI (s), $N_{SRS} = 2$ | Bit field mapped to index | SRI (s), $N_{SRS} = 3$ | Bit field mapped to index | SRI (s), $N_{SRS} = 4$ |
|---|---|---|---|---|---|---|---|
| 0 | 0 | 0 | 0 or 0, 1 | 0 | 0 or 0, 1 | 0 | 0 or 0, 1 |
| 1 | N/A or reserved | 1 | 1 | 1 | 1 or 0, 2 | 1 | 1 or 0, 2 |
|   |   | 2 | N/A or reserved | 2 | 2 or 1, 2 | 2 | 2 or 0, 3 |
|   |   | 3 | reserved | 3 | N/A or reserved | 3 | 3 or 1, 2 |
|   |   |   |   |   |   | 4 | 1, 3 |
|   |   |   |   |   |   | 5 | 2, 3 |
|   |   |   |   |   |   | 6 | N/A or reserved |
|   |   |   |   |   |   | 7 | reserved |

TABLE 6C

An example of a mapping from second index to second SRI in case of $L_{max} = 3$

| Bit field mapped to index | SRI (s), $N_{SRS} = 1$ | Bit field mapped to index | SRI (s), $N_{SRS} = 2$ | Bit field mapped to index | SRI (s), $N_{SRS} = 3$ | Bit field mapped to index | SRI (s), $N_{SRS} = 4$ |
|---|---|---|---|---|---|---|---|
| 0 | 0 | 0 | 0 or 0, 1 | 0 | 0 or 0, 1 | 0 | 0 or 0, 1 or 0, 1, 2 |
| 1 | N/A or reserved | 1 | 1 | 1 | 1 or 0, 2 | 1 | 1 or 0, 2 or 0, 1, 3 |
|   |   | 2 | N/A or reserved | 2 | 2 or 1, 2 | 2 | 2 or 0, 3 or 0, 2, 3 |
|   |   | 3 | reserved | 3 | 0, 1, 2 | 3 | 3 or 1, 2 or 1, 2, 3 |
|   |   |   |   | 4 | N/A or reserved | 4 | 1, 3 |
|   |   |   |   | 5-7 | reserved | 5 | 2, 3 |
|   |   |   |   |   |   | 6 | N/A or reserved |
|   |   |   |   |   |   | 7 | reserved |

TABLE 6D

An example of a mapping from second index to second SRI in case of $L_{max} = 4$

| Bit field mapped to index | SRI (s), $N_{SRS} = 1$ | Bit field mapped to index | SRI (s), $N_{SRS} = 2$ | Bit field mapped to index | SRI (s), $N_{SRS} = 3$ | Bit field mapped to index | SRI (s), $N_{SRS} = 4$ |
|---|---|---|---|---|---|---|---|
| 0 | 0 | 0 | 0 or 0, 1 | 0 | 0 or 0, 1 | 0 | 0 or 0, 1 or 0, 1, 2 |
| 1 | N/A or reserved | 1 | 1 | 1 | 1 or 0, 2 | 1 | 1 or 0, 2 or 0, 1, 3 |
|   |   | 2 | N/A or reserved | 2 | 2 or 1, 2 | 2 | 2 or 0, 3 or 0, 2, 3 |
|   |   | 3 | reserved | 3 | 0, 1, 2 | 3 | 3 or 1, 2 or 1, 2, 3 |
|   |   |   |   | 4 | N/A or reserved | 4 | 1, 3 |
|   |   |   |   | 5-7 | reserved | 5 | 2, 3 |
|   |   |   |   |   |   | 6 | N/A or reserved |
|   |   |   |   |   |   | 7 | reserved |

It is to be understood that the above examples shown in Tables 6A to 6D are merely for illustration, and do not make limitation for the present disclosure. In some embodiments, a subset of columns and/or a subset of rows in Tables 6A to 6D may be used.

As another example, the terminal device 120 may determine the second number of bits Bb in the second SRI field by equation (10) below.

$$Bb = \left\lceil \log_2\left(\max\binom{N_{SRS\_b}}{k}\right)\right\rceil \quad (10)$$

where $k=1, \ldots \min(L_{max}, N_{SRS\_b})$, $N_{SRS\_b}$ denotes the number of SRS resources in the second SRS resource set, and $L_{max}$ denotes the maximum number of layers for the set of PUSCH transmissions. It should be noted that this equation is merely an example, and any other suitable forms are also feasible. For illustration, some examples of mapping from the second index to the second SRI are shown in Tables 7A to 7D below. In some embodiments where $N_{SRS\_a}=1$ and Bb=0, the second SRI field may be omitted.

TABLE 7A

An example of a mapping from second index to second SRI in case of $L_{max} = 1$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
|   |   | 2 | 2 | 2 | 2 |
|   |   | 3 | reserved | 3 | 3 |

TABLE 7B

An example of a mapping from second index to second SRI in case of $L_{max} = 2$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 or 0, 1 | 0 | 0 or 0, 1 | 0 | 0 or 0, 1 |
| 1 | 1 | 1 | 1 or 0, 2 | 1 | 1 or 0, 2 |
|   |   | 2 | 2 or 1, 2 | 2 | 2 or 0, 3 |
|   |   | 3 | reserved | 3 | 3 or 1, 2 |
|   |   |   |   | 4 | 1, 3 |
|   |   |   |   | 5 | 2, 3 |
|   |   |   |   | 6 | N/A or reserved |
|   |   |   |   | 7 | reserved |

TABLE 7C

An example of a mapping from second index to second SRI in case of $L_{max} = 3$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 or 0, 1 | 0 | 0 or 0, 1 | 0 | 0 or 0, 1 or 0, 1, 2 |
| 1 | 1 | 1 | 1 or 0, 2 | 1 | 1 or 0, 2 or 0, 1, 3 |
|   |   | 2 | 2 or 1, 2 | 2 | 2 or 0, 3 or 0, 2, 3 |

TABLE 7C-continued

An example of a mapping from second index to second SRI in case of $L_{max} = 3$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
|   |   | 3 | 0, 1, 2 | 3 | 3 or 1, 2 or 1, 2, 3 |
|   |   |   |   | 4 | 1, 3 |
|   |   |   |   | 5 | 2, 3 |
|   |   |   |   | 6-7 | reserved |

TABLE 7D

An example of a mapping from second index to second SRI in case of $L_{max} = 4$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 or 0, 1 | 0 | 0 or 0, 1 | 0 | 0 or 0, 1 or 0, 1, 2 |
| 1 | 1 | 1 | 1 or 0, 2 | 1 | 1 or 0, 2 or 0, 1, 3 |
|   |   | 2 | 2 or 1, 2 | 2 | 2 or 0, 3 or 0, 2, 3 |
|   |   | 3 | 0, 1, 2 | 3 | 3 or 1, 2 or 1, 2, 3 |
|   |   |   |   | 4 | 1, 3 |
|   |   |   |   | 5 | 2, 3 |
|   |   |   |   | 6-7 | Reserved |

It is to be understood that the above examples shown in Tables 7A to 7D are merely for illustration, and do not make limitation for the present disclosure. In some embodiments, a subset of columns and/or a subset of rows in Tables 7A to 7D may be used. In some embodiments, the SRI(s) for the second subset (For example, SRI(s) in at least one of Tables 6A to 6D and Tables 7A to 7D) may be associated to be at least one of $\{X_1\}$, $\{X_2, X_3\}$, $\{X_4, X_5, X_6\}$, $\{X_7, X_8, X_9, X_{10}\}$. For example, each of $X_1, X_2, X_3, X_4, X_5, X_6, X_7, X_8, X_9, X_{10}$ may be any one of 0, 1, 2, 3. For another example, $X_1$ may be any one of $\{0, 1, 2, 3\}$. For another example, $\{X_2, X_3\}$ may be any one of $\{0, 1\}$, $\{0, 2\}$, $\{0, 3\}$, $\{1, 2\}$, $\{1, 3\}$, $\{2, 3\}$. For another example, $\{X_4, X_5, X_6\}$ may be any one of $\{0, 1, 2\}$, $\{0, 1, 3\}$, $\{0, 2, 3\}$, $\{1, 2, 3\}$. For another example, $\{X_7, X_8, X_9, X_{10}\}$ may be $\{0, 1, 2, 3\}$. In some embodiments, the SRI(s) for the second subset (For example, SRI(s) in at least one of Tables 6A to 6D and Tables 7A to 7D) is associated to which one of $\{X_1\}$, $\{X_2, X_3\}$, $\{X_4, X_5, X_6\}$, $\{X_7, X_8, X_9, X_{10}\}$ depends on the number of SRS resource(s) in the first subset, which is indicated by the first SRI. For example, if the number of SRS resource in the first subset is 1, the SRI(s) for the second subset is $\{X_1\}$. For another example, if the number of SRS resource in the first subset is 2, the SRI(s) for the second subset is $\{X_2, X_3\}$. For another example, if the number of SRS resource in the first subset is 3, the SRI(s) for the second subset is $\{X_4, X_5, X_6\}$. For another example, if the number of SRS resource in the first subset is 4, the SRI(s) for the second subset is $\{X_7, X_8, X_9, X_{10}\}$.

So far, the above description is made on the case that the DCI comprises two SRI fields. In some alternative embodiments, the DCI may comprise only one SRI field (i.e., the third field, also referred to a third SRI field herein). In this case, the terminal device 120 may determine the number of bits (also referred to as a third number of bits) in the third SRI field, and determine the third SRI field from the DCI based on the third number of bits. Then, the terminal device 120 may determine the first and second subset of SRS resources based on the third SRI field. This will be detailed in connection with Embodiments 4 to 5 below.

Embodiment 4

In this embodiment, a third field indicates a third index associated with at least one of a first SRI for the first subset of SRS resources and a second SRI for the second subset of SRS resources. In other words, each codepoint or bit field mapped to index indicates one or both of the first and second SRIs.

In some embodiments, for codebook based uplink transmission, the third number of bits Bc in the third field may be ranged from zero to $\lceil \log_2(N_{SRS\_a}*N_{SRSb}+N_{SRS\_a}+N_{SRS\_b}) \rceil$, where $N_{SRS\_a}$ denotes the number of SRS resources in the first SRS resource set, and $N_{SRS\_b}$ denotes the number of SRS resources in the second SRS resource set. Bc is a non-negative integer. For example, $0 \leq Bc \leq \log_2(N_{SRS\_a}*N_{SRSb}+N_{SRS\_a}+N_{SRS\_b})\rceil$.

In some alternative embodiments, for codebook based uplink transmission, the third number of bits Bc in the third field may be ranged from zero to $\lceil \log_2(\Sigma_{j=1}^{X} N_{SRS\_a,\,j}*N_{SRS\_b,\,j}) \rceil$, where j denotes an index for the number of SRS resources with $Q_j$ ports in at least one of the first SRS resource set and the second SRS resource set, X denotes a total number of all different values of $Q_j$, and $N_{SRS\_a,\,j}$ denotes the number of SRS resources with $Q_j$ ports in the first SRS resource set, and $N_{SRS\_b,\,j}$ denotes the number of SRS resources with $Q_j$ ports in the second SRS resource set. For example, $0 \leq Bc \leq \log_2(\Sigma_{j=1}^{X} N_{SRS\_a,\,j}*N_{SRS\_b,\,j}) \rceil$.

In some embodiments, for non-codebook based uplink transmission, the third number of bits Bc in the third field may be ranged from zero to $$\left\lceil \log_2\left( \sum_{k=1}^{min(L_{max},N_{SRS\_a},N_{SRS\_b})} \binom{N_{SRS\_a}}{k} * \binom{N_{SRS\_b}}{k} + \sum_{k=1}^{min(L_{max},N_{SRS\_a},N_{SRS\_b})} \binom{N_{SRS\_a}}{k} + \sum_{k=1}^{min(L_{max},N_{SRS\_a},N_{SRS\_b})} \binom{N_{SRS\_b}}{k} \right) \right\rceil,$$

where $N_{SRS\_a}$ denotes the number of SRS resources in the first SRS resource set, $N_{SRS\_b}$ denotes the number of SRS resources in the second SRS resource set, and $L_{max}$ denotes the maximum number of layers for the set of PUSCH transmissions. For example, $$0 \leq Bc \leq$$
$$\left\lceil \log_2\left( \sum_{k=1}^{min(L_{max},N_{SRS\_a},N_{SRS\_b})} \binom{N_{SRS\_a}}{k} * \binom{N_{SRS\_b}}{k} + \sum_{k=1}^{min(L_{max},N_{SRS\_a},N_{SRS\_b})} \binom{N_{SRS\_a}}{k} + \sum_{k=1}^{min(L_{max},N_{SRS\_a},N_{SRS\_b})} \binom{N_{SRS\_b}}{k} \right) \right\rceil.$$

In some alternative embodiments, for non-codebook based uplink transmission, the third number of bits Bc in the third field may be ranged from zero $$\left\lceil \log_2\left( \max\left( \binom{N_{SRS\_a}}{k} * \binom{N_{SRS\_b}}{k} \right) + \max\left( \binom{N_{SRS\_a}}{k} \right) + \max\left( \binom{N_{SRS\_b}}{k} \right) \right) \right\rceil,$$

to where $k=1, \ldots \min(L_{max}, N_{SRS\_a}, N_{SRS\_b})$, $N_{SRS\_a}$ denotes the number of SRS resources in the first SRS resource set, $N_{SRS\_b}$ denotes the number of SRS resources in the second SRS resource set, and $L_{max}$ denotes the maximum number of layers for the set of PUSCH transmissions. For example, $$0 \leq Bc \leq$$
$$\left\lceil \log_2\left( \max\left( \binom{N_{SRS\_a}}{k} * \binom{N_{SRS\_b}}{k} \right) + \max\left( \binom{N_{SRS\_a}}{k} \right) + \max\left( \binom{N_{SRS\_b}}{k} \right) \right) \right\rceil.$$

In some embodiments where the third index indicates only one SRI (the first SRI or the second SRI) and the number of repetitions is M, the precoder for the M PUSCH transmissions/repetitions may be determined based on the indicated SRI, corresponding transmitted precoding matrix indicator (TPMI) and the transmission rank (for example, single TRP repetition (3GPP Release 15/16 repetition)).

In some embodiments, the set of PUSCH transmissions comprises a first subset of PUSCH transmissions and a second subset of PUSCH transmissions. In some embodiments, if the third index indicates both the first and second SRIs and the number of repetitions M≥2, the precoder for the first subset of PUSCH transmissions/repetitions may be determined based on the first SRI indicated by the third index, TPMI (e.g. first TPMI) and the transmission rank, and the precoder for the second subset of PUSCH transmissions/repetitions may be determined based on the second SRI indicated by the third index, TPMI (e.g. second TPMI) and the transmission rank. (for example, multi-TRP repetition).

In some embodiments, if the third index indicates both the first and second SRIs and the number of repetitions M=1, the precoder for the PUSCH transmission/repetition is based on the first SRI indicated in the SRI field, TPMI (e.g. first TPMI) and the transmission rank. (for example, single TRP transmission)

In some alternative embodiments, if the third index indicates both the first and second SRIs and the number of repetitions M=1, the precoder for the first subset of PUSCH transmissions/repetitions is based on the first SRI indicated in the SRI field, TPMI (e.g. first TPMI) and the transmission rank for some values of SRIs (S1), and the precoder for the second subset of PUSCH transmissions/repetitions is based on the second SRI indicated in the SRI field, TPMI (e.g. second TPMI) and the transmission rank for the other values of SRIs (S2). E.g., S1 mod 2=0, S2 mod 2=1.

Embodiment 5

In this embodiment, a third field indicates a third index associated with a third SRI for both the first subset of SRS resources and the second subset of SRS resources. In other words, the third SRI is applied to both the first and second SRS resource sets. In these embodiments, the terminal device 120 may determine the first subset of SRS resources based on the third SRI, and also determine the second subset of SRS resources based on the third SRI.

In some embodiments, for codebook based uplink transmission, the number of SRS resources configured in the first and second SRS resource sets are same. Assuming that the number of SRS resources is $N_{SRS}$, the number of bits Bc in the third SRI field may be determined from equation (11) below.

$$Bc = \lceil \log_2(\max(N_{SRS})) \rceil \tag{11}$$

where $N_{SRS}$ denotes the number of SRS resources in each of the first and second SRS resource sets. The third SRI indicated in the third SRI field is applied to both the first and second SRS resource sets.

In some embodiments, if $N_{SRS}=1$, Bc=0. For example, the third SRI field may be omitted. For example, if each of the first and second SRS resource sets has a single SRS resource, two SRS resources (the SRS resource in the first SRS resource set and the SRS resource in the second SRS resource set) are assumed for the set of PUSCH transmissions/repetitions. For example, if the number of PUSCH transmissions/repetitions M≥2, the two SRS resources are assumed for these PUSCH transmissions/repetitions. As another example, if M=1, the SRS resource in the first SRS resource set is assumed for the PUSCH transmission/repetition.

In some embodiments, if $N_{SRS}=2$, Bc=1, two SRIs are indicated by the third index, and each of the two SRIs corresponds to one SRS resource in each SRS resource set. An example of a mapping from the third index to the third SRI is shown in Table 8 below.

TABLE 8

An example of a mapping from the third index to SRIs

| Bit field mapped to index | SRI(s), $N_{SRS} = 2$ |
|---|---|
| 0 | 0; 0 |
| 1 | 1; 1 |

For example, if M=1, the first SRI (for example, indicating SRS resource(s) in the first SRS resource set) is assumed for the PUSCH transmission/repetition. As another example, if M=1 and bit field mapped to index is 0, the first SRI is assumed for the PUSCH transmission/repetition. If M=1 and bit field mapped to index is 1, the second SRI is assumed for the PUSCH transmission/repetition.

In some embodiments, if $N_{SRS}=3$, Bc=2, two SRIs are indicated by the third index, and each of the two SRIs corresponds to one SRS resource in each SRS resource set. An example of a mapping from the third index to SRIs is shown in Table 9 below.

TABLE 9

An example of a mapping from the third index to SRIs

| Bit field mapped to index | SRI(s), $N_{SRS} = 3$ |
|---|---|
| 0 | 0; 0 |
| 1 | 1; 1 |
| 2 | 2; 2 |
| 3 | Reserved or 0, 1, 2 in first/second SRS resource set |

For example, if M=1, the first SRI (for example, indicating SRS resource(s) in the first SRS resource set) is assumed for the PUSCH transmission/repetition. As another example, if M=1 and bit field mapped to index is 0 or 2, the first SRI is assumed for the PUSCH transmission/repetition. If M=1 and bit field mapped to index is 1, the second SRI is assumed for the PUSCH transmission/repetition.

In some embodiments, if $N_{SRS}=4$ and Bc=2, two SRIs are indicated by the third index, and each of the two SRIs corresponds to one SRS resource in each SRS resource set. An example of a mapping from the third index to SRIs is shown in Table 10 below.

TABLE 10

An example of a mapping from the third index to SRIs

| Bit field mapped to index | SRI(s), $N_{SRS} = 4$ |
|---|---|
| 0 | 0; 0 |
| 1 | 1; 1 |
| 2 | 2; 2 |
| 3 | 3; 3 |

For example, if M=1, the first SRI (for example, indicating SRS resource(s) in the first SRS resource set) is assumed for the PUSCH transmission/repetition. As another example, if M=1 and bit field mapped to index is 0 or 2, the first SRI is assumed for the PUSCH transmission/repetition. If M=1 and bit field mapped to index is 1 or 3, the second SRI is assumed for the PUSCH transmission/repetition.

In some embodiments, for non-codebook based uplink transmission, the number of SRS resources configured in the first and second SRS resource sets are same. Assuming that the number of SRS resources is $N_{SRS}$, and there are same number of layers for two sets of PUSCH transmissions/repetitions, the number of bits Bc in the third SRI field may be determined by equation (12) below.

$$Bc = \left\lceil \log_2\left( \sum_{k=1}^{min(L_{max}, N_{SRS})} \binom{N_{SRS}}{k} \right) \right\rceil \quad (12)$$

where $N_{SRS}$ denotes the number of SRS resources in each of the first and second SRS resource sets, and $L_{max}$ denotes the maximum number of layers for the set of PUSCH transmissions. In this case, two SRIs are indicated by the third index, or the single SRI(s) indicated in the SRI field are applied to both SRS resource sets.

In some embodiments, if $N_{SRS}=1$, Bc=0, the third SRI field may be omitted. For example, if each of the first and second SRS resource sets has a single SRS resource, two SRS resources (the SRS resource in the first SRS resource set and the SRS resource in the second SRS resource set) are assumed for the set of PUSCH transmissions/repetitions. If the number PUSCH transmissions/repetitions M≥2, the two SRS resources are assumed for the set of PUSCH transmissions/repetitions. If M=1, the SRS resource in the first SRS resource set is assumed for the set of PUSCH transmissions/repetitions.

In some embodiments, if $N_{SRS} \geq 2$, two SRIs are indicated in the third SRI field, and each of the two SRIs corresponds to one SRS resource in each SRS resource set. For example, if M=1, the first SRI (for example, indicating SRS resource(s) in the first SRS resource set) is assumed for the set of PUSCH transmissions/repetitions. As another example, if M=1 and bit field mapped to index is 0, the first SRI is assumed for the set of PUSCH transmissions/repetitions. If M=1 and bit field mapped to index is 1, the second SRI is assumed for the set of PUSCH transmissions/repetitions. For illustration, some examples of a mapping from the third index to SRIs are shown in Tables 11A to 11D below.

TABLE 11A

An example of a mapping from third index to SRIs in case of $L_{max} = 1$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
| --- | --- | --- | --- | --- | --- |
| 0 | 0; 0 | 0 | 0; 0 | 0 | 0; 0 |
| 1 | 1; 1 | 1 | 1; 1 | 1 | 1; 1 |
|   |      | 2 | 2; 2 | 2 | 2; 2 |
|   |      | 3 | Reserved or 0, 1, 2 in first/second SRS resource set | 3 | 3; 3 |

TABLE 11B

An example of a mapping from third index to SRIs in case of $L_{max} = 2$

| Bit field mapped to index | SRI(s), $N_{SRS\_a} = 2$ | Bit field mapped to index | SRI(s), $N_{SRS\_a} = 3$ | Bit field mapped to index | SRI(s), $N_{SRS\_a} = 4$ |
| --- | --- | --- | --- | --- | --- |
| 0 | 0; 0 | 0 | 0; 0 | 0 | 0; 0 |
| 1 | 1; 1 | 1 | 1; 1 | 1 | 1; 1 |
| 2 | 0, 1; 0, 1 | 2 | 2; 2 | 2 | 2; 2 |
| 3 | Reserved or SRIs in the first/second SRS resource set | 3 | 0, 1; 0, 1 | 3 | 3; 3 |
|   |   | 4 | 0, 2; 0, 2 | 4 | 0, 1; 0, 1 |
|   |   | 5 | 1, 2; 1, 2 | 5 | 0, 2; 0, 2 |
|   |   | 6-7 | Reserved or SRIs in the first/second set | 6 | 0, 3; 0, 3 |
|   |   |   |   | 7 | 1, 2; 1, 2 |
|   |   |   |   | 8 | 1, 3; 1, 3 |
|   |   |   |   | 9 | 2, 3; 2, 3 |
|   |   |   |   | 10-15 | Reserved or SRIs in the first/second set |

TABLE 11C

An example of a mapping from third index to SRIs in case of $L_{max} = 3$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
| --- | --- | --- | --- | --- | --- |
| 0 | 0; 0 | 0 | 0; 0 | 0 | 0; 0 |
| 1 | 1; 1 | 1 | 1; 1 | 1 | 1; 1 |
| 2 | 0, 1; 0, 1 | 2 | 2; 2 | 2 | 2; 2 |
| 3 | Reserved or SRIs in the first/second SRS resource set | 3 | 0, 1; 0, 1 | 3 | 3; 3 |
|   |   | 4 | 0, 2; 0, 2 | 4 | 0, 1; 0, 1 |
|   |   | 5 | 1, 2; 1, 2 | 5 | 0, 2; 0, 2 |
|   |   | 6 | 0, 1, 2; 0, 1, 2 | 6 | 0, 3; 0, 3 |
|   |   | 7 | Reserved or SRIs in the first/second SRS resource set | 7 | 1, 2; 1, 2 |
|   |   |   |   | 8 | 1, 3; 1, 3 |
|   |   |   |   | 9 | 2, 3; 2, 3 |
|   |   |   |   | 10 | 0, 1, 2; 0, 1, 2 |
|   |   |   |   | 11 | 0, 1, 3; 0, 1, 3 |
|   |   |   |   | 12 | 0, 2, 3; 0, 2, 3 |
|   |   |   |   | 13 | 1, 2, 3; 1, 2, 3 |

TABLE 11C-continued

An example of a mapping from third index to SRIs in case of $L_{max} = 3$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| | | | | 14-15 | reserved or SRIs in the first/second SRS resource set |

TABLE 11D

An example of a mapping from third index to SRIs in case of $L_{max} = 4$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0; 0 | 0 | 0; 0 | 0 | 0; 0 |
| 1 | 1; 1 | 1 | 1; 1 | 1 | 1; 1 |
| 2 | 0, 1; 0, 1 | 2 | 2; 2 | 2 | 2; 2 |
| 3 | Reserved or SRIs in the first/second SRS resource set | 3 | 0, 1; 0, 1 | 3 | 3; 3 |
| | | 4 | 0, 2; 0, 2 | 4 | 0, 1; 0, 1 |
| | | 5 | 1, 2; 1, 2 | 5 | 0, 2; 0, 2 |
| | | 6 | 0, 1, 2; 0, 1, 2 | 6 | 0, 3; 0, 3 |
| | | 7 | Reserved or SRIs in the first/second SRS resource set | 7 | 1, 2; 1, 2 |
| | | | | 8 | 1, 3; 1, 3 |
| | | | | 9 | 2, 3; 2, 3 |
| | | | | 10 | 0, 1, 2; 0, 1, 2 |
| | | | | 11 | 0, 1, 3; 0, 1, 3 |
| | | | | 12 | 0, 2, 3; 0, 2, 3 |
| | | | | 13 | 1, 2, 3; 1, 2, 3 |
| | | | | 14 | 0, 1, 2, 3; 0, 1, 2, 3 |
| | | | | 15 | Reserved or SRIs in the first/second SRS resource set |

It is to be understood that the above examples shown in Tables 11A to 11D are merely for illustration, and do not make limitation for the present disclosure. In some embodiments, a subset of columns and/or a subset of rows in Tables 11A to 11D may be used.

In some embodiments, the terminal device 120 may receive the indication indicating one or more resources selected from the first and second SRS resource sets via at least one of RRC, MAC CE and DCI, the terminal device 120 may determine the first and second subsets based on the indication. In some embodiments, the terminal device 120 may receive an indication indicating a subset of values of SRI(s) as described in above embodiments via at least one of RRC, MAC CE and DCI, the terminal device 120 may determine the first and second subsets based on the indication. In this way, a subset of available SRIs for the first and second SRS resource sets may be defined or configured. Thus, the number of bits for the SRI field can be further reduced, and thus the signaling overhead in DCI can be saved.

Return to FIG. 2, upon determination of the first and second subset of SRS resources, the terminal device 120 may transmit 204 the set of PUSCH transmissions to the network device 110. In some embodiments, the set of PUSCH transmissions may comprise a first subset of PUSCH transmissions and a second subset of PUSCH transmissions. For example, the first subset of PUSCH transmissions are associated with the first TRP, and the second subset of PUSCH transmissions are associated with the second TRP. The terminal device 120 may transmit the first subset of PUSCH transmissions based on the first subset of SRS resources, and transmit the second subset of PUSCH transmissions based on the second subset of SRS resources.

In some embodiments where the DCI comprises the first SRI for the first subset and the second SRI for the second subset, if the first SRI indicates no resource in the first subset, the terminal device 120 may transmit the second subset of PUSCH transmissions based on the second subset. Additionally or alternatively, the terminal device 120 may disenable the first subset of PUSCH transmissions.

In some embodiments, if the second SRI indicates no resource in the second subset, the terminal device 120 may transmit the first subset of PUSCH transmissions based on the first subset. Additionally or alternatively, the terminal device 120 may disenable the second subset of PUSCH transmissions.

In some embodiments where the DCI comprises only one SRI field indicating a third index associated with a third SRI for both the first and second subsets and the set of PUSCH transmissions comprise one PUSCH transmission, the terminal device 120 may transmit the one PUSCH transmission based on either one of the first subset of SRS resources or the second subset of SRS resources. In some embodiments, if a value of the third index is even, the terminal device 120 may transmit the one PUSCH transmission based on the first subset. If the value of the third index is odd, the terminal device 120 may transmit the one PUSCH transmission based on the second subset. If there is no indication of the third index, the terminal device 120 may transmit the one PUSCH transmission based on the first subset.

With the process of FIG. 2, SRS resources for PUSCH repetitions can be determined upon consideration of overhead and flexibility, especially flexibility for dynamic switching between single-TRP and multi-TRP transmissions. Correspondingly, embodiments of the present disclosure also provide methods and devices of communication for PUSCH repetitions. This will be described below in connection with FIGS. 3 and 4.

Example Implementation of Methods

Figure 3:
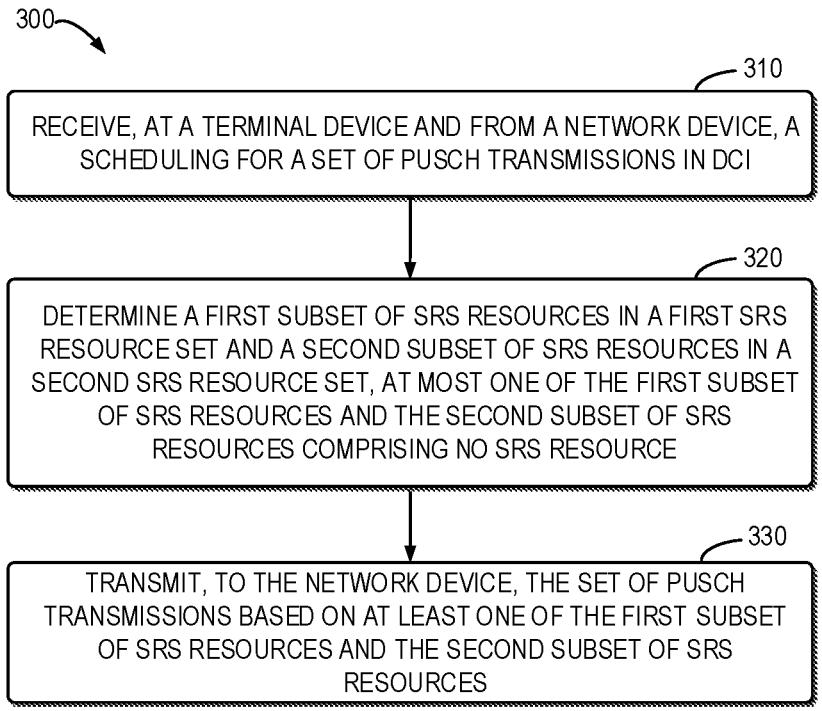
FIG. 3 illustrates a flowchart of an example method during a scheduling of PUSCH transmissions in DCI implemented at a terminal device in accordance with some embodiments of the present disclosure.

FIG. 3 illustrates a flowchart of an example method 300 during a scheduling of PUSCH transmissions in DCI implemented at a terminal device in accordance with some embodiments of the present disclosure. The method 300 can be implemented at the terminal device 120 shown in FIG. 1. For the purpose of discussion, the method 300 will be described with reference to FIG. 1. It is to be understood that the method 300 may include additional acts not shown and/or may omit some shown acts, and the scope of the present disclosure is not limited in this regard.

At block 310, the terminal device 120 receives a scheduling for a set of PUSCH transmissions in DCI. In some embodiments, the terminal device 120 may be configured with first and second SRS resource sets.

At block 320, the terminal device 120 determines a first subset of SRS resources in the first SRS resource set and a second subset of SRS resources in the second SRS resource set. In some embodiments, at most one of the first subset of SRS resources and the second subset of SRS resources comprises no SRS resource. In other words, the terminal device 120 selects one or more SRS resources from at least one of the first and second SRS resource sets. This means that the terminal device 120 may not select any SRS resource from one of the first and second SRS resource sets. In this case, the terminal device 120 selects one or more SRS resources from the other of the first and second SRS resource sets. In some embodiments, the terminal device 120 may perform the above selection or non-selection with a SRI indication from the network device 110. In some embodiments, the terminal device 120 may perform the above selection or non-selection without the SRI indication from the network device 110.

In some embodiments, the DCI may comprise a first field indicating a first index associated with a first SRI for the first subset and a second field indicating a second index associated with a second SRI for the second subset. In these embodiments, the terminal device 120 may determine the first subset based on the first SRI and/or determine the second subset based on the second SRI.

In some embodiments, the terminal device 120 may determine a first number of bits in the first field based on $\lceil \log_2(N_{SRS\_a}) \rceil$ or $\lceil \log_2(N_{SRS\_a}+1) \rceil$, where $N_{SRS\_a}$ denotes the number of SRS resources in the first SRS resource set; determine a second number of bits in the second field based on $\lceil \log_2(N_{SRS\_b}+1) \rceil$, where $N_{SRS\_b}$ denotes the number of SRS resources in the second SRS resource set; and determine the first and second fields from the DCI based on the first and second number of bits.

In some embodiments, the terminal device 120 may determine a first number of bits in the first field based on $$\left\lceil \log_2\left(\sum_{k=1}^{\min(L_{max},N_{SRS\_a})} \binom{N_{SRS\_a}}{k}\right)\right\rceil \text{ or }$$

$$\left\lceil \log_2\left(\sum_{k=1}^{\min(L_{max},N_{SRS\_a})} \binom{N_{SRS\_a}}{k}+1\right)\right\rceil,$$

where $N_{SRS\_a}$ denotes the number of SRS resources in the first SRS resource set, and $L_{max}$ denotes the maximum number of layers for the set of PUSCH transmissions; determine a second number of bits in the second field based or $$\left\lceil \log_2\left(\sum_{k=1}^{\min(L_{max},N_{SRS\_b})} \binom{N_{SRS\_b}}{k}+1\right)\right\rceil,$$

where $N_{SRS\_b}$ denotes the number of SRS resources in the second SRS resource set, and $L_{max}$ denotes the maximum number of layers for the set of PUSCH transmissions; and determine the first and second fields from the DCI based on the first and second number of bits.

In some embodiments, the terminal device 120 may determine the second subset based on at least one of the following: the number of ports for SRS resources in the first subset, the number of SRS resources in the first subset, the first index, the second index, a value of the first SRI, or a value of the second SRI. In some embodiments, the terminal device 120 may determine the number of bits in the second field based on the maximum number of SRS resources with a same number of ports in the second SRS resource set.

In some embodiments, the terminal device 120 may determine the number of bits in the second field based on $\lceil \log_2(\max(N_i)+1) \rceil$ or $\lceil \log_2(\max(N_i)) \rceil$, where i denotes an index for the number of SRS resources with $P_i$ ports in the second SRS resource set, and i=1, . . . G, or i=0, . . . G−1, where G denotes a total number of all different values of $P_i$, and $N_i$ denotes the number of SRS resources with $P_i$ ports in the second SRS resource set.

In some embodiments, the terminal device 120 may determine the number of bits in the second field based on $$\left\lceil \log_2\left(\max\binom{N_{SRS\_b}}{k}+1\right)\right\rceil \text{ or }$$

$$\left\lceil \log_2\left(\max\binom{N_{SRS\_b}}{k}\right)\right\rceil,$$

where k=1, . . . min($L_{max}$, $N_{SRS\_b}$), $N_{SRS\_b}$ denotes the number of SRS resources in the second SRS resource set, and $L_{max}$ denotes the maximum number of layers for the set of PUSCH transmissions.

In some embodiments, the DCI may comprise a third field indicating a third index associated with at least one of a first SRI for the first subset and a second SRI for the second subset. In these embodiments, the terminal device 120 may determine the first subset based on the first SRI and/or determine the second subset based on the second SRI.

In some embodiments, the third number of bits in the third field may be ranged from zero to $\lceil \log_2(N_{SRS\_a}*N_{SRSb}+N_{SRS\_a}+N_{SRS\_b}) \rceil$, where $N_{SRS\_a}$ denotes the number of SRS resources in the first SRS resource set, and $N_{SRS\_b}$ denotes the number of SRS resources in the second SRS resource set. In some embodiments, the third number of bits in the third field is ranged from zero to $\lceil \log_2(\Sigma_{j=1}^{X} N_{SRS\_a,j} * N_{SRS\_b,j}) \rceil$, where j denotes an index for the number of SRS resources with $Q_j$ ports in at least one of the first SRS resource set and the second SRS resource set, X denotes a total number of all different values of $Q_j$, and $N_{SRS\_a,j}$ denotes the number of SRS resources with $Q_j$ ports in the first SRS resource set, and $N_{SRS\_b,j}$ denotes the number of SRS resources with $Q_j$ ports in the second SRS resource set.

In some embodiments, the third number of bits in the third field may be ranged from zero to $$\left\lceil \log_2\left(\sum_{k=1}^{min(L_{max},N_{SRS\_a},N_{SRS\_b})}\binom{N_{SRS\_a}}{k}*\binom{N_{SRS\_b}}{k}\right. + \right.$$
$$\left.\left.\sum_{k=1}^{min(L_{max},N_{SRS\_a},N_{SRS\_b})}\binom{N_{SRS\_a}}{k} + \sum_{k=1}^{min(L_{max},N_{SRS\_a},N_{SRS\_b})}\binom{N_{SRS\_b}}{k}\right)\right\rceil,$$

where $N_{SRS\_a}$ denotes the number of SRS resources in the first SRS resource set, $N_{SRS\_b}$ denotes the number of SRS resources in the second SRS resource set, and $L_{max}$ denotes the maximum number of layers for the set of PUSCH transmissions.

In some embodiments, the third number of bits in the third field may be ranged $$\left\lceil \log_2\left(\max\left(\binom{N_{SRS\_a}}{k}*\binom{N_{SRS\_b}}{k}\right) + \max\binom{N_{SRS\_a}}{k} + \max\binom{N_{SRS\_b}}{k}\right)\right\rceil,$$

from zero to where k=1, . . . min($L_{max}$, $N_{SRS\_a}$, $N_{SRS\_b}$), $N_{SRS\_a}$ denotes the number of SRS resources in the first SRS resource set, $N_{SRS\_b}$ denotes the number of SRS resources in the second SRS resource set, and $L_{max}$ denotes the maximum number of layers for the set of PUSCH transmissions.

In some embodiments, the DCI may comprise a third field indicating a third index associated with a third SRI for the first and second subsets. In these embodiments, the terminal device may determine the first subset based on the third SRI and/or determine the second subset based on the third SRI.

In some embodiments, the terminal device 120 may receive an indication indicating one or more resources selected from the first and second SRS resource sets, and determine the first and second subsets based on the indication.

At block 330, the terminal device 120 transmits the set of PUSCH transmissions based on at least one of the first and second subsets. In some embodiments, the set of PUSCH transmissions comprises a first subset of PUSCH transmissions and a second subset of PUSCH transmissions. In some embodiments, the terminal device 120 may transmit the first subset of PUSCH transmissions based on the first subset, and transmit the second subset of PUSCH transmissions based on the second subset.

In some embodiments, if the first SRI indicates no resource in the first subset, the terminal device 120 may transmit the second subset of PUSCH transmissions based on the second subset. In some embodiments, if the first SRI indicates no resource in the first subset, the terminal device 120 may transmit the set of PUSCH transmissions based on the second subset. In some embodiments, if the first SRI indicates no resource in the first subset, the terminal device 120 may disenable the first subset of PUSCH transmissions.

In some embodiments where the set of PUSCH transmissions comprises a first subset of PUSCH transmissions and a second subset of PUSCH transmissions, the terminal device 120 may transmit the first subset of PUSCH transmissions based on the first subset if the second SRI indicates no resource in the second subset. In some embodiments, if the second SRI indicates no resource in the second subset, the terminal device 120 may transmit the set of PUSCH transmissions based on the first subset. In some embodiments, if the second SRI indicates no resource in the second subset, the terminal device 120 may disenable the second subset of PUSCH transmissions.

In some embodiments where the set of PUSCH transmissions comprises one PUSCH transmission, the terminal device 120 may transmit the one PUSCH transmission based on either one of the first subset or the second subset. In some embodiments, if a value of the third index is even, the terminal device 120 may transmit the one PUSCH transmission based on the first subset. In some embodiments, if the value of the third index is odd, the terminal device 120 may transmit the one PUSCH transmission based on the second subset. In some embodiments, if there is no indication of the third index, the terminal device 120 may transmit the one PUSCH transmission based on the first subset.

So far, the method implemented at a terminal device is described. Correspondingly, embodiments of the present disclosure also provide a method implemented at a network device. This will be described below with reference to FIG. 4.

Figure 4:
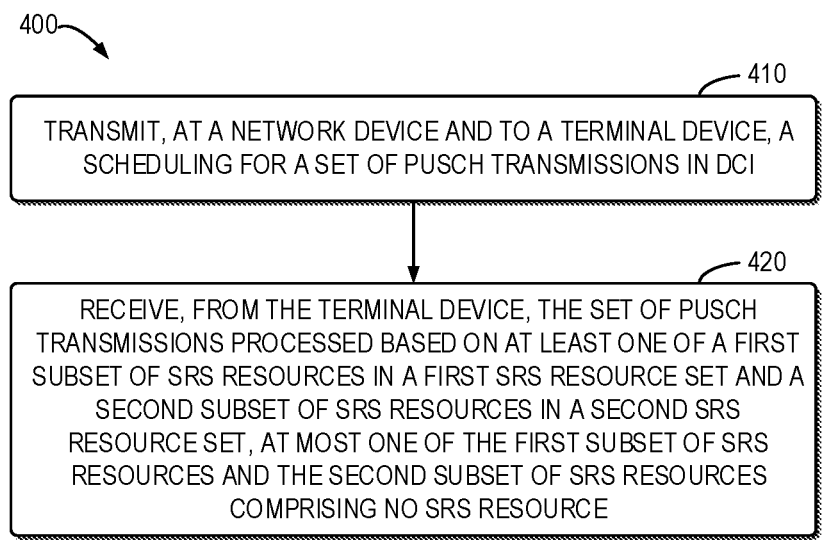
FIG. 4 illustrates a flowchart of an example method during a scheduling of PUSCH transmissions in DCI implemented at a network device in accordance with some embodiments of the present disclosure.

FIG. 4 illustrates a flowchart of an example method 400 during a scheduling of PUSCH transmissions in DCI implemented at a network device in accordance with some embodiments of the present disclosure. The method 400 can be implemented at the network device 110 shown in FIG. 1. For the purpose of discussion, the method 400 will be described with reference to FIG. 1. It is to be understood that the method 400 may include additional acts not shown and/or may omit some shown acts, and the scope of the present disclosure is not limited in this regard.

As shown in FIG. 4, at block 410, the network device 110 transmits a scheduling for a set of PUSCH transmissions in DCI. In some embodiments, the DCI may comprise a first field indicating a first index associated with a first SRI for the first subset and a second field indicating a second index associated with a second SRI for the second subset.

In some embodiments, the network device 110 may determine a first number of bits in the first field based on $\lceil \log_2(N_{SRS\_a}) \rceil$ or $\lceil \log_2(N_{SRS\_a}+1) \rceil$, wherein $N_{SRS\_a}$ denotes the number of SRS resources in the first SRS resource set; determine a second number of bits in the second field based on $\lceil \log_2(N_{SRS\_b}+1) \rceil$, wherein $N_{SRS\_b}$ denotes the number of SRS resources in the second SRS resource set; and transmit the DCI based on the first and second number of bits.

In some embodiments, the network device 110 may determine a first number of bits in the first field based on $$\left\lceil \log_2\left(\sum_{k=1}^{min(L_{max},N_{SRS\_a})}\binom{N_{SRS\_a}}{k}\right)\right\rceil \text{ or }$$
$$\left\lceil \log_2\left(\sum_{k=1}^{min(L_{max},N_{SRS\_a})}\binom{N_{SRS\_a}}{k}+1\right)\right\rceil,$$

wherein $N_{SRS\_a}$ denotes the number of SRS resources in the first SRS resource set, and $L_{max}$ denotes a maximum number of layers for the set of PUSCH transmissions; determine a second number of bits in the second field based on $$\left\lceil \log_2\left(\sum\nolimits_{k=1}^{min(L_{max}, N_{SRS\_b})} \binom{N_{SRS\_b}}{k} + 1\right)\right\rceil,$$

wherein $N_{SRS\_b}$ denotes the number of SRS resources in the second SRS resource set, and $L_{max}$ denotes a maximum number of layers for the set of PUSCH transmissions; and transmit the DCI based on the first and second number of bits.

In some embodiments, the network device 110 may determine the second subset based on at least one of the number of ports for SRS resources in the first subset, the number of SRS resources in the first subset, the first index, the second index, a value of the first SRI, or a value of the second SRI. In some embodiments, the network device 110 may determine the second subset by determining the number of bits in the second field based on the maximum number of SRS resources with a same number of ports in the second SRS resource set. In some embodiments, the network device 110 may determine the second subset by determining the number of bits in the second field based on $\lceil \log_2(\max(N_i)+1)\rceil$ or $\lceil \log_2(\max(N_i))\rceil$, where i denotes an index for the number of SRS resources with $P_i$ ports in the second SRS resource set, and i=1, . . . G, or i=0, . . . G−1, where G denotes a total number of all different values of $P_i$, and $N_i$ denotes the number of SRS resources with $P_i$ ports in the second SRS resource set.

In some embodiments, the network device 110 may determine the second subset by determining the number of bits in the second field based on $$\left\lceil \log_2\left(\max\binom{N_{SRS\_b}}{k} + 1\right)\right\rceil \text{ or } \left\lceil \log_2\left(\max\binom{N_{SRS\_b}}{k}\right)\right\rceil,$$

where k=1, . . . $\min(L_{max}, N_{SRS\_b})$, $N_{SRS\_b}$ denotes the number of SRS resources in the second SRS resource set, and $L_{max}$ denotes the maximum number of layers for the set of PUSCH transmissions.

In some embodiments, the DCI may comprise a third field indicating a third index associated with at least one of a first SRI for the first subset and a second SRI for the second subset. In some embodiments, the DCI may comprise a third field indicating a third index associated with a third SRI for the first and second subsets.

In some embodiments, the third number of bits in the third field may be ranged from zero to $\lceil \log_2(N_{SRS\_a}*N_{SRSb}+N_{SRS\_a}+N_{SRS\_b})\rceil$, where $N_{SRS\_a}$ denotes the number of SRS resources in the first SRS resource set, and $N_{SRS\_b}$ denotes the number of SRS resources in the second SRS resource set. In some embodiments, the third number of bits in the third field may be ranged from zero to $\lceil \log_2(\Sigma_{j=1}^{X} N_{SRS\_a, j}*N_{SRS\_b, j})\rceil$, where j denotes an index for the number of SRS resources with $Q_j$ ports in at least one of the first SRS resource set and the second SRS resource set, X denotes a total number of all different values of $Q_j$, and $N_{SRS\_a, j}$ denotes the number of SRS resources with $Q_j$ ports in the first SRS resource set, and $N_{SRS\_b, j}$ denotes the number of SRS resources with $Q_j$ ports in the second SRS resource set.

In some embodiments, the third number of bits in the third field may be ranged from zero to $$\left\lceil \log_2\left(\sum\nolimits_{k=1}^{min(L_{max}, N_{SRS\_a}, N_{SRS\_b})} \binom{N_{SRS\_a}}{k} * \binom{N_{SRS\_b}}{k} + \right.\right.$$

-continued
$$\left. \left. \sum\nolimits_{k=1}^{min(L_{max}, N_{SRS\_a}, N_{SRS\_b})} \binom{N_{SRS\_a}}{k} + \sum\nolimits_{k=1}^{min(L_{max}, N_{SRS\_a}, N_{SRS\_b})} \binom{N_{SRS\_b}}{k} \right)\right\rceil,$$

where $N_{SRS\_a}$ denotes the number of SRS resources in the first SRS resource set, $N_{SRS\_b}$ denotes the number of SRS resources in the second SRS resource set, and $L_{max}$ denotes the maximum number of layers for the set of PUSCH transmissions. In some embodiments, the third number of bits in the third field may be ranged from zero to $$\left\lceil \log_2\left(\max\left(\binom{N_{SRS\_a}}{k} * \binom{N_{SRS_b}}{k}\right) + \max\binom{N_{SRS\_a}}{k} + \max\binom{N_{SRS\_b}}{k}\right)\right\rceil,$$

where k=1, . . . $\min(L_{max}, N_{SRS\_a}, N_{SRS\_b})$, $N_{SRS\_a}$ denotes the number of SRS resources in the first SRS resource set, $N_{SRS\_b}$ denotes the number of SRS resources in the second SRS resource set, and $L_{max}$ denotes the maximum number of layers for the set of PUSCH transmissions.

In some embodiments, the network device 110 may transmit, to the terminal device 120, an indication indicating one or more resources selected from the first and second SRS resource sets. In this way, a subset of available SRIs for the first and second SRS resource sets may be defined or configured. Thus, the number of bits for the SRI field can be further reduced, and thus the signaling overhead in DCI can be saved.

At block 420, the network device 110 may receive, from the terminal device 120, the set of PUSCH transmissions processed based on at least one of a first subset of SRS resources in a first SRS resource set and a second subset of SRS resources in a second SRS resource set. In some embodiments, at most one of the first subset of SRS resources and the second subset of SRS resources comprises no SRS resource.

In some embodiments where the set of PUSCH transmissions comprises a first subset of PUSCH transmissions and a second subset of PUSCH transmissions, the network device 110 may receive the set of PUSCH transmissions by at least one of the following: receiving the first subset of PUSCH transmissions processed based on the first subset; or receiving the second subset of PUSCH transmissions processed based on the second subset.

In some embodiments where the set of PUSCH transmissions comprises a first subset of PUSCH transmissions and a second subset of PUSCH transmissions, the network device 110 may receive the set of PUSCH transmissions by at least one of the following: in accordance with a determination that the first SRI indicates no resource in the first subset, receiving the second subset of PUSCH transmissions processed based on the second subset; in accordance with a determination that the first SRI indicates no resource in the first subset, receiving the set of PUSCH transmissions processed based on the second subset; or in accordance with a determination that the first SRI indicates no resource in the first subset, receiving no transmission in the first subset of PUSCH transmissions.

In some embodiments where the set of PUSCH transmissions comprises a first subset of PUSCH transmissions and a second subset of PUSCH transmissions, the network device 110 may receive the set of PUSCH transmissions by at least one of the following: in accordance with a determination that the second SRI indicates no resource in the second subset, receiving the first subset of PUSCH transmissions processed based on the first subset; in accordance with a determination that the second SRI indicates no resource in the second subset, receiving the set of PUSCH transmissions based on the first subset; or in accordance with a determination that the second SRI indicates no resource in the second subset, receiving no transmission in the second subset of PUSCH transmissions.

In some embodiments where the set of PUSCH transmissions comprises one PUSCH transmission, the network device 110 may receive the set of PUSCH transmissions by receiving the one PUSCH transmission processed based on either one of the first subset or the second subset. In some embodiments, the network device 110 may receive the one PUSCH by at least one of the following: in accordance with a determination that a value of the third index is even, receiving the one PUSCH transmission processed based on the first subset; in accordance with a determination that the value of the third index is odd, receiving the one PUSCH transmission processed based on the second subset; or in accordance with a determination that there is no indication of the third index, receiving the one PUSCH transmission based on the first subset.

It can be seen that, embodiments of the present disclosure provide a solution for PUSCH repetitions. Embodiments of the present disclosure enable determining SRS resources for PUSCH repetitions with reduced overhead and increased flexibility.

Example Implementation of Device

Figure 5:
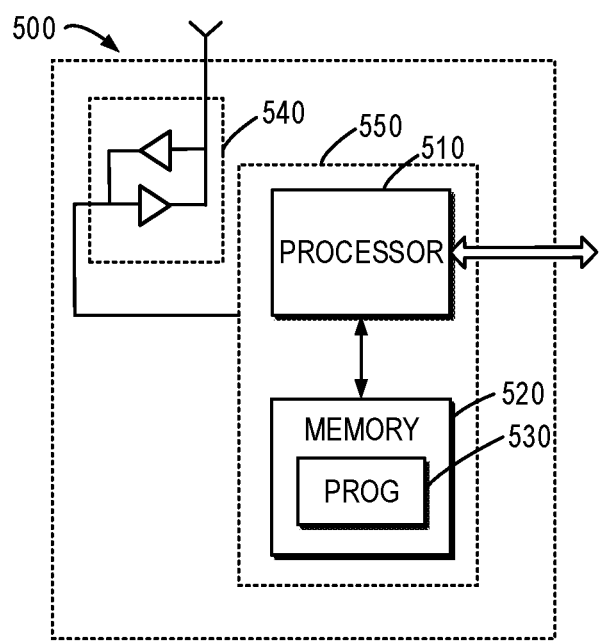
FIG. 5 is a simplified block diagram of a device that is suitable for implementing embodiments of the present disclosure.

FIG. 5 is a simplified block diagram of a device 500 that is suitable for implementing embodiments of the present disclosure. The device 500 can be considered as a further example implementation of the network device 110 or the terminal device 120 as shown in FIG. 1. Accordingly, the device 500 can be implemented at or as at least a part of the network device 110 or the terminal device 120.

As shown, the device 500 includes a processor 510, a memory 520 coupled to the processor 510, a suitable transmitter (TX) and receiver (RX) 540 coupled to the processor 510, and a communication interface coupled to the TX/RX 540. The memory 510 stores at least a part of a program 530. The TX/RX 540 is for bidirectional communications. The TX/RX 540 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 530 is assumed to include program instructions that, when executed by the associated processor 510, enable the device 500 to operate in accordance with the embodiments of the present disclosure, as discussed herein with reference to FIGS. 1 to 4. The embodiments herein may be implemented by computer software executable by the processor 510 of the device 500, or by hardware, or by a combination of software and hardware. The processor 510 may be configured to implement various embodiments of the present disclosure. Furthermore, a combination of the processor 510 and memory 520 may form processing means 550 adapted to implement various embodiments of the present disclosure.

The memory 520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 520 is shown in the device 500, there may be several physically distinct memory modules in the device 500. The processor 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

In some embodiments, a terminal device comprises circuitry configured to: receive, from a network device, a scheduling for a set of PUSCH transmissions in DCI; determine a first subset of SRS resources in a first SRS resource set and a second subset of SRS resources in a second SRS resource set, at most one of the first subset of SRS resources and the second subset of SRS resources comprising no SRS resource; and transmit, to a network device, the set of PUSCH transmissions based on the at least one of the first subset of SRS resources and the second subset of SRS resources.

In some embodiments, the DCI comprises a first field indicating a first index associated with a first SRS resource indicator (SRI) for the first subset and a second field indicating a second index associated with a second SRI for the second subset. In these embodiments, wherein the circuitry may be configured to determine the first and second subsets by at least one of the following: determining the first subset based on the first SRI; or determining the second subset based on the second SRI.

In some embodiments, the circuitry may be further configured to: determine a first number of bits in the first field based on $\lceil \log_2(N_{SRS\_a}) \rceil$ or $\lceil \log_2(N_{SRS\_b}+1) \rceil$, where $N_{SRS\_a}$ denotes the number of SRS resources in the first SRS resource set; determine a second number of bits in the second field based on $\lceil \log_2(N_{SRS\_b}+1) \rceil$, where $N_{SRS\_b}$ denotes the number of SRS resources in the second SRS resource set; and determine the first and second fields from the DCI based on the first and second number of bits.

In some embodiments, the circuitry may be further configured to: determine a first number of bits in the first field based on $$\left\lceil \log_2\left(\sum_{k=1}^{min(L_{max},N_{SRS\_a})} \binom{N_{SRS\_a}}{k}\right)\right\rceil \text{ or}$$

$$\left\lceil \log_2\left(\sum_{k=1}^{min(L_{max},N_{SRS\_a})} \binom{N_{SRS\_a}}{k}+1\right)\right\rceil,$$

where $N_{SRS\_a}$ denotes the number of SRS resources in the first SRS resource set, and $L_{max}$ denotes the maximum number of layers for the set of PUSCH transmissions; determine a second number of bits in the second field based on $$\left\lceil \log_2\left(\sum_{k=1}^{min(L_{max},N_{SRS\_b})} \binom{N_{SRS\_b}}{k}+1\right)\right\rceil,$$

where $N_{SRS\_b}$ denotes the number of SRS resources in the second SRS resource set, and $L_{max}$ denotes the maximum number of layers for the set of PUSCH transmissions; and determine the first and second fields from the DCI based on the first and second number of bits.

In some embodiments, the set of PUSCH transmissions comprises a first subset of PUSCH transmissions and a second subset of PUSCH transmissions. In these embodiments, the circuitry is configured to transmit the set of PUSCH transmissions by at least one of the following: transmitting the first subset of PUSCH transmissions based on the first subset; or transmitting the second subset of PUSCH transmissions based on the second subset.

In some alternative embodiments, the circuitry is configured to transmit the set of PUSCH transmissions by at least one of the following: in accordance with a determination that the first SRI indicates no resource in the first subset, transmitting the second subset of PUSCH transmissions based on the second subset; in accordance with a determination that the first SRI indicates no resource in the first subset, transmitting the set of PUSCH transmissions based on the second subset; or in accordance with a determination that the first SRI indicates no resource in the first subset, disenabling the first subset of PUSCH transmissions.

In some alternative embodiments, the circuitry is configured to transmit the set of PUSCH transmissions by at least one of the following: in accordance with a determination that the second SRI indicates no resource in the second subset, transmitting the first subset of PUSCH transmissions based on the first subset; in accordance with a determination that the second SRI indicates no resource in the second subset, transmitting the set of PUSCH transmissions based on the first subset; or in accordance with a determination that the second SRI indicates no resource in the second subset, disenabling the second subset of PUSCH transmissions.

In some embodiments, the circuitry may be configured to determine the second subset based on at least one of the following: the number of ports for SRS resources in the first subset, the number of SRS resources in the first subset, the first index, the second index, a value of the first SRI, or a value of the second SRI.

In some embodiments, the circuitry may be configured to determine the second subset by at least one of the following: determining the number of bits in the second field based on the maximum number of SRS resources with a same number of ports in the second SRS resource set; or determining the number of bits in the second field based on $\lceil \log_2(\max(N_i)+1) \rceil$ or $\lceil \log_2(\max(N_i)) \rceil$, where i denotes an index for the number of SRS resources with $P_i$ ports in the second SRS resource set, and i=1, . . . G, or i=0, . . . G−1, where G denotes a total number of all different values of $P_i$, and $N_i$ denotes the number of SRS resources with $P_i$ ports in the second SRS resource set.

In some embodiments, the circuitry may be configured to determine the second subset by determining the number of bits in the second field based on $$\left\lceil \log_2\left(\max\binom{N_{SRS\_b}}{k}+1\right)\right\rceil \text{ or } \left\lceil \log_2\left(\max\binom{N_{SRS\_b}}{k}\right)\right\rceil,$$

where k=1, . . . min($L_{max}$, $N_{SRS\_b}$), $N_{SRS\_b}$ denotes the number of SRS resources in the second SRS resource set, and $L_{max}$ denotes the maximum number of layers for the set of PUSCH transmissions.

In some embodiments, the DCI may comprise a third field indicating a third index associated with at least one of a first SRI for the first subset and a second SRI for the second subset. In these embodiments, the circuitry may be configured to determine the first and second subsets by at least one of the following: determining the first subset based on the first SRI; or determining the second subset based on the second SRI.

In some embodiments, the third number of bits in the third field may be ranged from zero to $\lceil \log_2(N_{SRS\_a}*N_{SRSb}+N_{SRS\_a}+N_{SRS\_b}) \rceil$, where $N_{SRS\_a}$ denotes the number of SRS resources in the first SRS resource set, and $N_{SRS\_b}$ denotes the number of SRS resources in the second SRS resource set.

In some embodiments, the third number of bits in the third field may be ranged from zero to $\lceil \log_2(\Sigma_{j=1}^{X} N_{SRS\_a,\,j}*N_{SRS\_b,\,j}) \rceil$, where j denotes an index for the number of SRS resources with $Q_j$ ports in at least one of the first SRS resource set and the second SRS resource set, X denotes a total number of all different values of $Q_j$, and $N_{SRS\_a,\,j}$ denotes the number of SRS resources with $Q_j$ ports in the first SRS resource set, and $N_{SRS\_b,\,j}$ denotes the number of SRS resources with $Q_j$ ports in the second SRS resource set.

In some embodiments, the third number of bits in the third field may be ranged from zero to $$\left\lceil \log_2\left(\sum_{k=1}^{min(L_{max},N_{SRS\_a},N_{SRS\_b})}\binom{N_{SRS\_a}}{k}*\binom{N_{SRS\_b}}{k}+\sum_{k=1}^{min(L_{max},N_{SRS\_a},N_{SRS\_b})}\binom{N_{SRS\_a}}{k}+\sum_{k=1}^{min(L_{max},N_{SRS\_a},N_{SRS\_b})}\binom{N_{SRS\_b}}{k}\right)\right\rceil,$$

where $N_{SRS\_a}$ denotes the number of SRS resources in the first SRS resource set, $N_{SRS\_b}$ denotes the number of SRS resources in the second SRS resource set, and $L_{max}$ denotes the maximum number of layers for the set of PUSCH transmissions.

In some embodiments, the third number of bits in the third field may be ranged from zero to $$\left\lceil \log_2\left(\max\left(\binom{N_{SRS\_a}}{k}*\binom{N_{SRS_b}}{k}\right)+\max\binom{N_{SRS\_a}}{k}+\max\binom{N_{SRS\_b}}{k}\right)\right\rceil,$$

where k=1, . . . min($L_{max}$, $N_{SRS\_a}$, $N_{SRS\_b}$), $N_{SRS\_a}$ denotes the number of SRS resources in the first SRS resource set, $N_{SRS\_b}$ denotes the number of SRS resources in the second SRS resource set, and $L_{max}$ denotes the maximum number of layers for the set of PUSCH transmissions.

In some embodiments, the DCI may comprise a third field indicating a third index associated with a third SRI for the first and second subsets. In these embodiments, the circuitry may be configured to determine the first and second subsets by at least one of the following: determining the first subset based on the third SRI; or determining the second subset based on the third SRI.

In some embodiments, the set of PUSCH transmissions may comprise one PUSCH transmission. In these embodiments, the circuitry may be configured to transmit the set of PUSCH transmissions by transmitting the one PUSCH transmission based on either one of the first subset or the second subset. In some embodiments, the circuitry may be configured to transmit the one PUSCH by at least one of the following: in accordance with a determination that a value of the third index is even, transmitting the one PUSCH transmission based on the first subset; in accordance with a determination that the value of the third index is odd, transmitting the one PUSCH transmission based on the second subset; or in accordance with a determination that there is no indication of the third index, transmitting the one PUSCH transmission based on the first subset.

In some embodiments, the circuitry may be further configured to receive an indication indicating one or more resources selected from the first and second SRS resource sets, and determine the first and second subsets based on the indication.

In some embodiments, a network device comprises circuitry configured to: transmit, to a terminal device, a scheduling for a set of PUSCH transmissions in DCI; and receive, from the terminal device, the set of PUSCH transmissions processed based on at least one of a first subset of SRS resources in a first SRS resource set and a second subset of SRS resources in a second SRS resource set, at most one of the first subset of SRS resources and the second subset of SRS resources comprising no SRS resource. In some embodiments, the DCI may comprise a first field indicating a first index associated with a first SRI for the first subset and a second field indicating a second index associated with a second SRI for the second subset.

In some embodiments, the set of PUSCH transmissions may comprise a first subset of PUSCH transmissions and a second subset of PUSCH transmissions. In these embodiments, the circuitry may be configured to receive the set of PUSCH transmissions by at least one of the following: receiving the first subset of PUSCH transmissions processed based on the first subset; or receiving the second subset of PUSCH transmissions processed based on the second subset.

In some embodiments, the circuitry may be configured to receive the set of PUSCH transmissions by at least one of the following: in accordance with a determination that the first SRI indicates no resource in the first subset, receiving the second subset of PUSCH transmissions processed based on the second subset; in accordance with a determination that the first SRI indicates no resource in the first subset, receiving the set of PUSCH transmissions processed based on the second subset; or in accordance with a determination that the first SRI indicates no resource in the first subset, receiving no transmission in the first subset of PUSCH transmissions.

In some embodiments, the circuitry may be configured to receive the set of PUSCH transmissions by at least one of the following: in accordance with a determination that the second SRI indicates no resource in the second subset, receiving the first subset of PUSCH transmissions processed based on the first subset; in accordance with a determination that the second SRI indicates no resource in the second subset, receiving the set of PUSCH transmissions based on the first subset; or in accordance with a determination that the second SRI indicates no resource in the second subset, receiving no transmission in the second subset of PUSCH transmissions.

In some embodiments, the circuitry may be configured to transmit the scheduling by determining a first number of bits in the first field based on $\lceil \log_2(N_{SRS\_a}) \rceil$ or $\lceil \log_2(N_{SRS\_a}+1) \rceil$, wherein $N_{SRS\_a}$ denotes the number of SRS resources in the first SRS resource set; determining a second number of bits in the second field based on $\lceil \log_2(N_{SRS\_b}+1) \rceil$, wherein $N_{SRS\_b}$ denotes the number of SRS resources in the second SRS resource set; and transmitting the DCI based on the first and second number of bits.

In some embodiments, the circuitry may be configured to transmit the scheduling by determining a first number of bits in the first field based on $$\left\lceil \log_2\left(\sum\nolimits_{k=1}^{min(L_{max},N_{SRS\_a})}\binom{N_{SRS\_a}}{k}\right)\right\rceil \text{ or}$$

$$\left\lceil \log_2\left(\sum\nolimits_{k=1}^{min(L_{max},N_{SRS\_a})}\binom{N_{SRS\_a}}{k}+1\right)\right\rceil,$$

wherein $N_{SRS\_a}$ denotes the number of SRS resources in the first SRS resource set, and $L_{max}$ denotes a maximum number of layers for the set of PUSCH transmissions; determining a second number of bits in the second field based on $$\left\lceil \log_2\left(\sum\nolimits_{k=1}^{min(L_{max},N_{SRS\_b})}\binom{N_{SRS\_b}}{k}+1\right)\right\rceil,$$

wherein $N_{SRS\_b}$ denotes the number of SRS resources in the second SRS resource set, and $L_{max}$ denotes a maximum number of layers for the set of PUSCH transmissions; and transmitting the DCI based on the first and second number of bits.

In some embodiments, the circuitry may be configured to transmit the scheduling by determining the second subset based on at least one of the following: the number of ports for SRS resources in the first subset, the number of SRS resources in the first subset, the first index, the second index, a value of the first SRI, or a value of the second SRI.

In some embodiments, the circuitry may be configured to determine the second subset by at least one of the following: determining the number of bits in the second field based on the maximum number of SRS resources with a same number of ports in the second SRS resource set; or determining the number of bits in the second field based on $\lceil \log_2(max(N_i)+1) \rceil$ or $\lceil \log_2(max(N_i)) \rceil$, where i denotes an index for the number of SRS resources with $P_i$ ports in the second SRS resource set, and i=1, . . . G, or i=0, . . . G−1, where G denotes a total number of all different values of $P_i$, and $N_i$ denotes the number of SRS resources with $P_i$ ports in the second SRS resource set.

In some embodiments, the circuitry may be configured to determine the second subset by determining the number of bits in the second field based on $$\left\lceil \log_2\left(max\binom{N_{SRS\_b}}{k}+1\right)\right\rceil \text{ or } \left\lceil \log_2\left(max\binom{N_{SRS\_b}}{k}\right)\right\rceil,$$

where k=1, . . . $min(L_{max}, N_{SRS\_b})$, $N_{SRS\_b}$ denotes the number of SRS resources in the second SRS resource set, and $L_{max}$ denotes the maximum number of layers for the set of PUSCH transmissions.

In some embodiments, the DCI may comprise a third field indicating a third index associated with at least one of a first SRI for the first subset and a second SRI for the second subset. In some embodiments where the set of PUSCH transmissions comprises a first subset of PUSCH transmissions and a second subset of PUSCH transmissions, the circuitry may be configured to receive the set of PUSCH transmissions by at least one of the following: receiving the first subset of PUSCH transmissions based on the first subset, or receiving the second subset of PUSCH transmissions based on the second subset.

In some embodiments, the third number of bits in the third field may be ranged from zero to $\lceil \log_2(N_{SRS\_a}*N_{SRSb}+N_{SRS\_a}+N_{SRS\_b}) \rceil$, where $N_{SRS\_a}$ denotes the number of SRS resources in the first SRS resource set, and $N_{SRS\_b}$ denotes the number of SRS resources in the second SRS resource set.

In some embodiments, the third number of bits in the third field may be ranged from zero to $\lceil \log_2(\Sigma_{j=1}^{X} N_{SRS\_a,\ j} * N_{SRS\_b,\ j}) \rceil$, where j denotes an index for the number of SRS resources with $Q_j$ ports in at least one of the first SRS resource set and the second SRS resource set, X denotes a total number of all different values of $Q_j$, and $N_{SRS\_a,\ j}$ denotes the number of SRS resources with $Q_j$ ports in the first SRS resource set, and $N_{SRS\_b,\ j}$ denotes the number of SRS resources with $Q_j$ ports in the second SRS resource set.

In some embodiments, the third number of bits in the third field may be ranged from zero to $$\left\lceil \log_2\left(\sum_{k=1}^{\min(L_{max},N_{SRS\_a},N_{SRS\_b})} \binom{N_{SRS\_a}}{k}*\binom{N_{SRS\_b}}{k} + \sum_{k=1}^{\min(L_{max},N_{SRS\_a},N_{SRS\_b})} \binom{N_{SRS\_a}}{k} + \sum_{k=1}^{\min(L_{max},N_{SRS\_a},N_{SRS\_b})} \binom{N_{SRS\_b}}{k}\right)\right\rceil,$$

wherein $N_{SRS\_a}$ denotes the number of SRS resources in the first SRS resource set, $N_{SRS\_b}$ denotes the number of SRS resources in the second SRS resource set, and $L_{max}$ denotes the maximum number of layers for the set of PUSCH transmissions.

In some embodiments, the third number of bits in the third field may be ranged from zero to $$\left\lceil \log_2\left(\max\left(\binom{N_{SRS\_a}}{k}*\binom{N_{SRS_b}}{k}\right) + \max\binom{N_{SRS\_a}}{k} + \max\binom{N_{SRS\_b}}{k}\right)\right\rceil,$$

where k=1, . . . min($L_{max}$, $N_{SRS\_a}$, $N_{SRS\_b}$), $N_{SRS\_a}$ denotes the number of SRS resources in the first SRS resource set, $N_{SRS\_b}$ denotes the number of SRS resources in the second SRS resource set, and $L_{max}$ denotes the maximum number of layers for the set of PUSCH transmissions.

In some embodiments, the DCI may comprise a third field indicating a third index associated with a third SRI for the first and second subsets. In some embodiments where the set of PUSCH transmissions comprises one PUSCH transmission, the circuitry may be configured to receive the set of PUSCH transmissions by receiving the one PUSCH transmission processed based on either one of the first subset or the second subset. In some embodiments, the circuitry may be configured to receive the one PUSCH transmission by at least one of the following: in accordance with a determination that a value of the third index is even, receiving the one PUSCH transmission processed based on the first subset; in accordance with a determination that the value of the third index is odd, receiving the one PUSCH transmission processed based on the second subset; or in accordance with a determination that there is no indication of the third index, receiving the one PUSCH transmission based on the first subset.

In some embodiments, the circuitry may be configured to transmit the scheduling by transmitting an indication indicating one or more resources selected from the first and second SRS resource sets.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 3-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A user equipment (UE) comprising:
a receiver configured to receive, from a network device, downlink control information (DCI) for scheduling multiple physical uplink shared channel (PUSCH) transmissions, the DCI including first information, second information and third information, wherein
the first information indicates that a first sounding reference signal (SRS) resource set and a second SRS resource set are applied,
the second information indicates a first SRS resource indicator for the first SRS resource set, and
the third information indicates a second SRS resource indicator for the second SRS resource set, a bit length of the second SRS resource indicator being determined based on:

$$\left\lceil \log_2\left(\max\left(\begin{array}{c}N_{SRS}\\k\end{array}\right)\right)\right\rceil,$$

where
k=1, . . . min($L_{max}$, $N_{SRS}$),
$N_{SRS}$ denotes the number of SRS resources in the second SRS resource set, and
$L_{max}$ denotes the maximum number of layers for the multiple PUSCH transmissions, wherein
a processor is configured to apply the first SRS resource indicator and the second SRS resource indicator to the multiple PUSCH transmissions.

2. The UE according to claim 1, wherein
the second SRS resource indicator is determined based on the same number of layers for the first SRS indicator.

3. The UE according to claim 1, wherein
the bit length of the second SRS resource indicator is determined as a maximum value based on the number of layers for the first SRS indicator.

4. The UE according to claim 1, wherein
in a case of a non-codebook transmission, the bit length of the second SRS resource indicator is determined based on:

$$\left\lceil \log_2\left(\max\left(\begin{array}{c}N_{SRS}\\k\end{array}\right)\right)\right\rceil,$$

where
k=1, . . . min($L_{max}$, $N_{SRS}$),
$N_{SRS}$ denotes the number of SRS resources in the second SRS resource set, and
$L_{max}$ denotes the maximum number of layers for the multiple PUSCH transmissions, and
in a case of a codebook transmission, the bit length of the second SRS resource indicator is determined based on: $\lceil \log_2(N_{SRS}) \rceil$, where
$N_{SRS}$ corresponds to the number of configured SRS resources in the second SRS resource set.

5. The UE according to claim 1, wherein
a transmitter is configured to transmit a first subset of the multiple PUSCH transmissions based on the first SRS resource indicator, and
the transmitter is configured to transmit a second subset of the multiple PUSCH transmissions based on the second SRS resource indicator.

6. A method in a user equipment (UE), the method comprising:
receiving, from a network device, downlink control information (DCI) for scheduling multiple physical uplink shared channel (PUSCH) transmissions, the DCI including first information, second information and third information, wherein
the first information indicates that a first sounding reference signal (SRS) resource set and a second SRS resource set are applied,
the second information indicates a first SRS resource indicator for the first SRS resource set, and
the third information indicates a second SRS resource indicator for the second SRS resource set, a bit length of the second SRS resource indicator being determined based on:

$$\left\lceil \log_2\left(\max\left(\begin{array}{c}N_{SRS}\\k\end{array}\right)\right)\right\rceil,$$

where
k=1, . . . min($L_{max}$, $N_{SRS}$),
$N_{SRS}$ denotes the number of SRS resources in the second SRS resource set, and
$L_{max}$ denotes the maximum number of layers for the multiple PUSCH transmissions, wherein
the method comprises applying the first SRS resource indicator and the second SRS resource indicator to the multiple PUSCH transmissions.

7. The method according to claim 6, wherein
the second SRS resource indicator is determined based on the same number of layers for the first SRS indicator.

8. The method according to claim 6, wherein
the bit length of the second SRS resource indicator is determined as a maximum value based on the number of layers for the first SRS indicator.

9. The method according to claim 6 wherein
in a case of a non-codebook transmission, the bit length of the second SRS resource indicator is determined based on:

$$\left\lceil \log_2\left(\max\left(\begin{array}{c}N_{SRS}\\k\end{array}\right)\right)\right\rceil,$$

where
k=1, . . . min($L_{max}$, $N_{SRS}$),
$N_{SRS}$ denotes the number of SRS resources in the second SRS resource set, and
$L_{max}$ denotes the maximum number of layers for the multiple PUSCH transmissions, and
in a case of a codebook transmission, the bit length of the second SRS resource indicator is determined based on:
$\lceil \log_2(N_{SRS}) \rceil$, where
$N_{SRS}$ corresponds to the number of configured SRS resources in the second SRS resource set.

10. The method according to claim 6, wherein
the applying comprises:
transmitting a first subset of the multiple PUSCH transmissions based on the first SRS resource indicator, and
transmitting a second subset of the multiple PUSCH transmissions based on the second SRS resource indicator.

11. A network comprising:
a transmitter configured to transmit, to a user equipment (UE), downlink control information (DCI) for scheduling multiple physical uplink shared channel (PUSCH) transmissions, the DCI including first information, second information and third information, wherein
the first information indicates that a first sounding reference signal (SRS) resource set and a second SRS resource set are applied,
the second information indicates a first SRS resource indicator for the first SRS resource set, and
the third information indicates a second SRS resource indicator for the second SRS resource set, a bit length of the second SRS resource indicator being determined based on:

$$\left\lceil \log_2\left(\max\left(\begin{array}{c}N_{SRS}\\k\end{array}\right)\right)\right\rceil,$$

where
k=1, . . . min($L_{max}$, $N_{SRS}$),
$N_{SRS}$ denotes the number of SRS resources in the second SRS resource set, and
$L_{max}$ denotes the maximum number of layers for the multiple PUSCH transmissions, wherein
a receiver is configured to receive the multiple PUSCH transmissions based on the first SRS resource indicator and the second SRS resource indicator.

12. The network according to claim 11, wherein
the second SRS resource indicator is determined based on the same number of layers for the first SRS indicator.

13. The network according to claim 11, wherein
the bit length of the second SRS resource indicator is determined as a maximum value based on the number of layers for the first SRS indicator.

14. The network according to claim 11, wherein
in a case of a non-codebook transmission, the bit length of the second SRS resource indicator is determined based on:

$$\left\lceil \log_2\left(\max\left(\begin{array}{c}N_{SRS}\\k\end{array}\right)\right)\right\rceil,$$

where
k=1, . . . min($L_{max}$, $N_{SRS}$),
$N_{SRS}$ denotes the number of SRS resources in the second SRS resource set, and
$L_{max}$ denotes the maximum number of layers for the multiple PUSCH transmissions, and
in a case of a codebook transmission, the bit length of the second SRS resource indicator is determined based on:
$\lceil \log_2(N_{SRS}) \rceil$, where
$N_{SRS}$ corresponds to the number of configured SRS resources in the second SRS resource set.

15. The network according to claim 11, wherein
the receiver is configured to receive a first subset of the multiple PUSCH transmissions based on the first SRS resource indicator, and
the receiver is configured to receive a second subset of the multiple PUSCH transmissions based on the second SRS resource indicator.

16. A method in a network, the method comprising:
transmitting, to a user equipment (UE), downlink control information (DCI) for scheduling multiple physical uplink shared channel (PUSCH) transmissions, the DCI including first information, second information and third information, wherein
the first information indicates that a first sounding reference signal (SRS) resource set and a second SRS resource set are applied,
the second information indicates a first SRS resource indicator for the first SRS resource set, and
the third information indicates a second SRS resource indicator for the second SRS resource set, a bit length of the second SRS resource indicator being determined based on:

$$\left\lceil \log_2\left(\max\left(\begin{array}{c}N_{SRS}\\k\end{array}\right)\right)\right\rceil,$$

where
k=1, . . . min($L_{max}$, $N_{SRS}$),
$N_{SRS}$ denotes the number of SRS resources in the second SRS resource set, and
$L_{max}$ denotes the maximum number of layers for the multiple PUSCH transmissions, wherein
the method comprises receiving the multiple PUSCH transmissions based on the first SRS resource indicator and the second SRS resource indicator.

17. The network according to claim 16, wherein
the second SRS resource indicator is determined based on the same number of layers for the first SRS indicator.

18. The network according to claim 16, wherein
the bit length of the second SRS resource indicator is determined as a maximum value based on the number of layers for the first SRS indicator.

19. The network according to claim 16, wherein
in a case of a non-codebook transmission, the bit length of the second SRS resource indicator is determined based on:

$$\left\lceil \log_2\left(\max\left(\begin{array}{c} N_{SRS} \\ k \end{array}\right)\right)\right\rceil,$$

where
k=1, . . . min($L_{max}$, $N_{SRS}$),
$N_{SRS}$ denotes the number of SRS resources in the second SRS resource set, and
$L_{max}$ denotes the maximum number of layers for the multiple PUSCH transmissions, and
in a case of a codebook transmission, the bit length of the second SRS resource indicator is determined based on:
$\lceil \log_2(N_{SRS}) \rceil$, where
$N_{SRS}$ corresponds to the number of configured SRS resources in the second SRS resource set.

20. The network according to claim 16, wherein
the receiving comprises:
receiving a first subset of the multiple PUSCH transmissions based on the first SRS resource indicator, and
receiving a second subset of the multiple PUSCH transmissions based on the second SRS resource indicator.

\* \* \* \* \*